(12) United States Patent
Henke et al.

(10) Patent No.: US 12,074,422 B2
(45) Date of Patent: Aug. 27, 2024

(54) ARC FLASH SUPPRESSOR, SYSTEM, AND METHOD

(71) Applicant: Arc Suppression Technologies, Bloomington, MN (US)

(72) Inventors: Reinhold Henke, Alexandria, MN (US); Warren Kahle, Woodbury, MN (US)

(73) Assignee: Arc Suppression Technologies, Bloomington, MN (US)

( * ) Notice: Subject to any disclaimer, the term of this patent is extended or adjusted under 35 U.S.C. 154(b) by 0 days.

(21) Appl. No.: 17/874,568

(22) Filed: Jul. 27, 2022

(65) Prior Publication Data

US 2023/0238792 A1    Jul. 27, 2023

Related U.S. Application Data

(63) Continuation of application No. 17/714,287, filed on Apr. 6, 2022, now Pat. No. 11,411,382.

(60) Provisional application No. 63/303,187, filed on Jan. 26, 2022.

(51) Int. Cl.
　　*H02H 1/00*　　　(2006.01)
　　*H02H 7/26*　　　(2006.01)
　　*H02H 9/02*　　　(2006.01)

(52) U.S. Cl.
　　CPC .......... *H02H 1/0015* (2013.01); *H02H 7/26* (2013.01); *H02H 9/02* (2013.01)

(58) Field of Classification Search
　　CPC .................. H02H 7/26–30; H01H 1/0015
　　See application file for complete search history.

(56) References Cited

U.S. PATENT DOCUMENTS

| 7,821,749 | B2 | 10/2010 | Asokan et al. |
| 7,852,605 | B2 | 12/2010 | Hill |
| 7,929,260 | B2 | 4/2011 | Roscoe et al. |
| 8,040,517 | B1 | 10/2011 | Wu et al. |
| 8,054,594 | B2 | 11/2011 | Wu et al. |
| 8,154,730 | B2 | 4/2012 | Wu et al. |

(Continued)

FOREIGN PATENT DOCUMENTS

WO　　　2023146919　　　8/2023

OTHER PUBLICATIONS

"U.S. Appl. No. 17/714,287, Notice of Allowance mailed Jun. 24, 2022", 9 pgs.

(Continued)

*Primary Examiner* — Jared Fureman
*Assistant Examiner* — Christopher J Clark
(74) *Attorney, Agent, or Firm* — Schwegman Lundberg & Woessner, P.A.

(57) ABSTRACT

An arc flash suppressor, system, and method are disclosed. The arc flash suppressor includes a main processor, a current sensor processor, a voltage sensor processor, a plasma ignition detector, and an arc flash extinguishing circuit. The current sensor processor is configured to detect a slew rate of an input current from a power source. The voltage sensor processor is configured to detect a slew rate of an input voltage from the power source. The main processor is configured to cause the arc flash extinguishing circuit to create a short circuit condition over the power source to extinguish an arc flash upon detection of a critical current slew rate, a critical voltage slew rate, and plasma ignition.

20 Claims, 19 Drawing Sheets

(56) References Cited

U.S. PATENT DOCUMENTS

| | | | |
|---|---|---|---|
| 8,223,466 B2 | 7/2012 | Roscoe | |
| 8,278,811 B2 | 10/2012 | Engel et al. | |
| 8,319,173 B2 | 11/2012 | Schweitzer, III et al. | |
| 8,335,063 B2 | 12/2012 | Hooker et al. | |
| 8,441,151 B2 | 5/2013 | Huang | |
| 8,492,672 B2 | 7/2013 | Shea | |
| 8,593,769 B2 | 11/2013 | Schweitzer, III | |
| 8,803,069 B2 | 8/2014 | Kesler et al. | |
| 8,861,144 B2 | 10/2014 | Shea et al. | |
| 8,922,958 B2 | 12/2014 | Ganireddy et al. | |
| 9,046,391 B2 | 6/2015 | Schweitzer, III et al. | |
| 9,178,353 B2 | 11/2015 | Robbins | |
| 9,209,617 B2 | 12/2015 | Locker et al. | |
| 9,240,682 B2 | 1/2016 | Sivakumar et al. | |
| 9,325,167 B2 | 4/2016 | Kumfer et al. | |
| 9,385,524 B2 | 7/2016 | Rowny, Jr. et al. | |
| 9,391,441 B2 | 7/2016 | Liptak et al. | |
| 9,407,082 B2 | 8/2016 | Lagree et al. | |
| 9,468,084 B2 | 10/2016 | Kumar et al. | |
| 9,570,900 B2 | 2/2017 | Shea et al. | |
| 9,570,901 B2 | 2/2017 | Shea et al. | |
| 9,698,571 B2 | 7/2017 | Shea et al. | |
| 9,847,634 B2 | 12/2017 | Smith et al. | |
| 10,096,993 B2 | 10/2018 | Taillefer et al. | |
| 10,098,270 B2 | 10/2018 | Bugaris et al. | |
| 10,211,625 B2 | 2/2019 | Sivakumar et al. | |
| 10,447,023 B2 | 10/2019 | Politis et al. | |
| 10,523,000 B2 | 12/2019 | Shea et al. | |
| 10,804,689 B2 | 10/2020 | Zeller | |
| 11,043,344 B2 | 6/2021 | Von Zur Muehlen et al. | |
| 11,049,685 B2 | 6/2021 | Henricks | |
| 11,411,382 B1 | 8/2022 | Henke et al. | |
| 2005/0219775 A1 | 10/2005 | Shipp et al. | |
| 2007/0097582 A1 | 5/2007 | Shipp et al. | |
| 2008/0239592 A1 | 10/2008 | Roscoe et al. | |
| 2008/0239598 A1 | 10/2008 | Asokan et al. | |
| 2010/0321838 A1 | 12/2010 | Wu et al. | |
| 2013/0033796 A1 | 2/2013 | Shea | |
| 2013/0170084 A1* | 7/2013 | Strobl | G01R 31/69 361/79 |
| 2014/0078793 A1 | 3/2014 | Sivakumar et al. | |
| 2014/0192451 A1 | 7/2014 | Locker et al. | |
| 2014/0293491 A1 | 10/2014 | Robbins | |
| 2015/0236495 A1 | 8/2015 | Shea et al. | |
| 2015/0236496 A1 | 8/2015 | Shea et al. | |
| 2015/0372482 A1 | 12/2015 | Kumfer et al. | |
| 2016/0041222 A1* | 2/2016 | Handy | G01R 35/00 324/750.3 |
| 2016/0087425 A1 | 3/2016 | Sivakumar et al. | |
| 2016/0285259 A1 | 9/2016 | Shea et al. | |
| 2017/0070043 A1 | 3/2017 | Smith et al. | |
| 2018/0375466 A1* | 12/2018 | Chaintreuil | H02S 50/00 |
| 2019/0348245 A1 | 11/2019 | Henricks | |
| 2020/0091711 A1 | 3/2020 | Shea et al. | |
| 2021/0226437 A1* | 7/2021 | Lichauer | H02H 7/262 |

OTHER PUBLICATIONS

"International Application Serial No. PCT US2023 011546, International Search Report mailed May 23, 2023", 4 pgs.

"International Application Serial No. PCT US2023 011546, Written Opinion mailed May 23, 2023", 3 pgs.

* cited by examiner

US 12,074,422 B2

ARC FLASH SUPPRESSOR, SYSTEM, AND METHOD

PRIORITY APPLICATIONS

This application is a continuation of U.S. patent application Ser. No. 17/714,287, filed Apr. 6, 2022, which application claims the benefit of priority to U.S. Provisional Patent Application Ser. No. 63/303,187, filed Jan. 26, 2022, the contents of which are incorporated herein by reference in their entireties.

TECHNICAL FIELD

The present application relates generally to an arc flash suppressor and related systems and methods.

BACKGROUND

Arc flash may be the result of an electrical fault between two electrical power conductors. Such contact may be unintentional, e.g., from, an accidental shorting, breakdowns in insulation, corrosion, qualified or unqualified personnel, animals, and the like. Arc flash can be highly damaging to nearby equipment and people who may happen to be in proximity of the arc flash.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present document.

DETAILED DESCRIPTION

Figure 1:
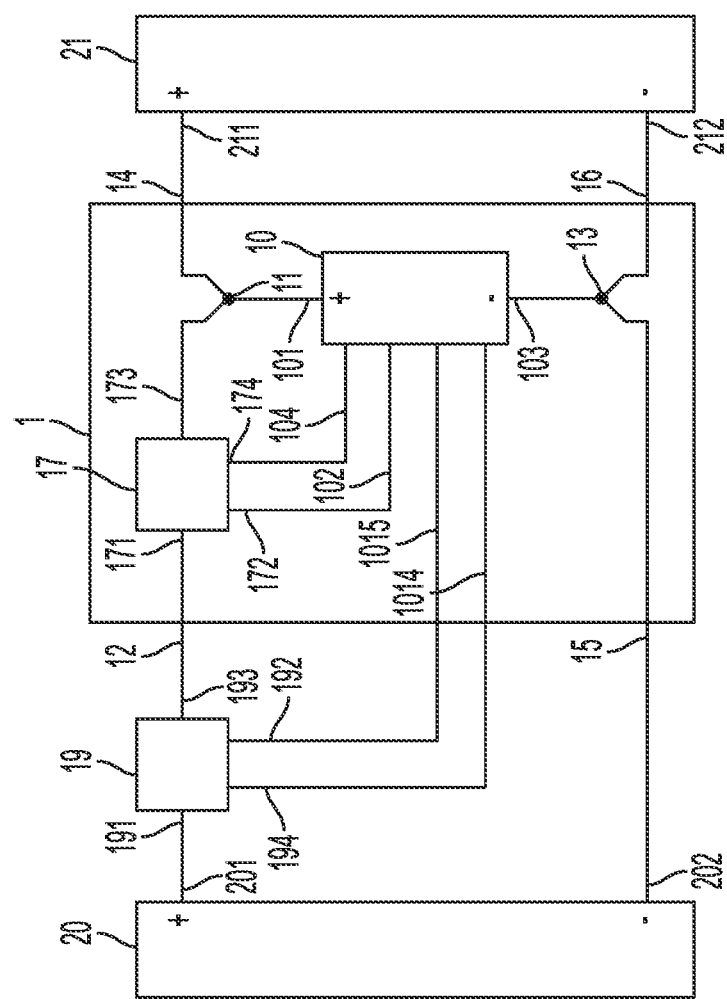
FIG. 1 is a system diagram including an arc flash suppressor, in an example embodiment.

It should be understood at the outset that although an illustrative implementation of one or more embodiments is provided below, the disclosed systems, methods, and/or apparatuses described with respect to FIGS. 1-19B may be implemented using any number of techniques, whether currently known or not yet in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In the following description, reference is made to the accompanying drawings that form a part hereof, and in which are shown, by way of illustration, specific embodiments which may be practiced. These embodiments are described in sufficient detail to enable those skilled in the art to practice the inventive subject matter, and it is to be understood that other embodiments may be utilized, and that structural, logical, and electrical changes may be made without departing from the scope of the present disclosure. The following description of example embodiments is, therefore, not to be taken in a limiting sense, and the scope of the present disclosure is defined by the appended claims.

An arc flash may be understood to be a high energy electrical fault condition in which an undesired, unintentional, and unexpected powerful release of electrical energy occurs, in various examples between electrical contacts as noted above, during which gaseous- or metallic-phase plasma ignites and burns between the electrical contacts (or other conductors in circumstances where the arc flash ignites between conductors which are not contacts, such as with wire chafing). An arc flash may be the result of a component failure, such as an unexpected dielectric breakdown (e.g., flashover) or unintentional metallic contact (e.g., a short circuit) between two electrodes.

While the consequences of arc flashes may have been recognized virtually since the advent of power systems, the specific causes of such arc flashes have not necessarily been well understood, resulting in generally ineffective attempts to prevent such arc flashes and a general tendency simply to contain the damage such an arc flash may cause. For instance, an optical detector has been utilized to indicate to a circuit breaker, fuse, or other overcurrent protective device that a potential arc flash has occurred and to cut power to limit the scope of the damage to that which has already occurred. But given that damage may occur within microseconds, such prior systems merely seek to limit the damage rather than preventing potentially catastrophic damage in the first place.

The present inventors have realized that an arc flash itself functions as a non-linear resistive circuit element. The non-linear resistive element is in effect connected in parallel to the power conductors and is supported by the fault current. Consequently, the arc itself functions as a path of least resistance for the resulting fault current, resulting in the propagation of the arc flash. By providing a lower resistance path for the rest of the system when the preconditions for an arc flash are detected, the arc flash may be suppressed.

Moreover, the present inventors have realized that the differentiation between voltage-borne and current-borne arc flashes makes arc flash suppression that may prevent significant damage possible. An arc flash borne out of current may be referred to herein as a thermionic emission-initiated arc flash. An arc flash borne out of voltage may be referred to as a field emission-initiated arc. In particular, the present inventors have recognized that thermionic emission arc flashes and field emission arc flashes are distinctly different and separately detectable events. In particular, a field emission arc ("F-arc") may be the result of dielectric breakdown between opposing electrodes resulting in gaseous arc plasma ignition. A thermionic emission arc ("T-arc") may be the result of metallic contact between opposing electrodes resulting in metallic arc plasma ignition. F-arcs and T-arcs may be elements of an arc flash.

Though arc flashes derive from current, the duration of an arc flash or arc flash event involving multiple arc flashes may be extended in part by the inductance in a circuit including a contact that causes the re-initiation of a field emission-initiated arc. After the arc flash plasma extinguishes, additional arc flash plasmas may reignite due to the electromagnetic field from an inductive element across a widening contact or electrode gap, e.g., from the opening of the metallic contact, thereby extending the total plasma burn duration. Consequently, an arc flash may reignite multiple times during the same event.

An arc flash suppressor may be implemented to suppress or eliminate arc flash. The arc flash suppressor may be an integral part of a power system architecture or design or may be implemented as a system or circuit that can be incorporated into an existing system. At high power levels, arc flashes may result in out-of-control, chaotic, energetic, explosive, or otherwise destructive events that may result in the release of energy that may be dangerous to nearby people or structures.

Certain circuits, systems, or locations may be particularly prone to arc faults, particularly those where wire chafing or other deterioration may tend to occur, including but not limited to an electrical power panel. Given that such panels may be located in residential, commercial, or industrial locations and be serviced by conventional electricians, the risks to life or property from arc flash events may be significant. Examples of other circuits or systems that may be prone to arc flashes include branch circuits, power contacts, wire bundles, and equipment enclosures, among many other potential locations. Arc flashes may occur within or outside such components or systems.

The arc flash suppressors and systems disclosed herein may include multiple advantages over other systems that purport to suppress arc flashes or, more precisely, limit the damage of arc flashes. The arc flash suppressors activate in a narrowly defined, configured, designed, specified, window of time and specified spatial zone. The arc flash suppressors may active within microseconds of detecting the conditions for an arc flash, versus milliseconds for prior attempts to prevent arc flash. The arc flash suppressors may convert an uncontrolled arc flash fault condition to a controlled short circuit current fault condition.

The arc flash suppressors may detect arc flash critical pre-conditions. Such pre-conditions include a positive critical current slew rate flowing through the power lead, phase, or rail indicating that this condition is indicative of an impending arc flash plasma ignition, or the arc flash plasma ignition which was predicted by the detection of the positive critical current slew rate and the detection of the negative critical voltage slew rate. The arc flash suppressors may further detect arc flash critical conditions, such as a negative critical voltage slew rate present across the power leads, phases, or rails indicating that this condition is indicative of an impending arc flash plasma ignition. The arc flash suppressors may detect arc flash critical timing conditions, such as the timing-specific relationship between the critical negative voltage slew rate, the critical positive current slew rate, and arc flash plasma ignition. Consequently, the arc flash suppressors may utilize a negative voltage slew rate detector, a positive current slew rate detector, and/or a plasma ignition detector to detect, identify, and optionally record the specific type of F-arc or T-arc initiations and trigger an arc flash plasma extinguishing circuit, as disclosed herein. As is known in the art, a slew rate is a rate of change of a characteristic over time.

The arc flash suppressors may function in parallel with the power source voltage, e.g., by being in parallel with power source leads, phases, or rails, rather than in series between the power source and the power load. Consequently, the arc flash suppressors may ignore abnormal power conditions, noise conditions, and other arc flash spoofing signals like power instabilities, transients, etc., that don't meet the criteria for an arc flash and thereby avoid nuisance tripping of the arc flash suppressors. Consequently, unless an arc flash initiation has been detected and subsequently followed and confirmed by an arc flash plasma ignition, the arc flash suppressor may not be triggered.

The arc flash suppressors may accommodate selective zoning and coordination, circuit zoning, and circuit element scaling. Coordination, selection, and activation range may be selectable by changing current, voltage, or plasma ignition gain and slope settings. The arc flash suppressors may overlap protected zones or separate non-overlapping arc flash protected zones. The arc flash suppressors may be scalable, configurable, and adaptable to match the circuit breaker parameters in the specific arc flash zones.

The arc flash suppressors disclosed herein may provide for arc suppression more generally and/or may serve a variety of different functions. Consequently, while the term "arc flash suppressor" will be applied herein, the various circuits described may function as any of the following circuits: a hybrid arc flash suppressor; an arc flash extinguisher; an arc flash current to a short circuit current converter; an arc flash interrupter; a hybrid arc fault suppressor; an arc fault extinguisher; an arc fault current to a short circuit fault converter; an arc fault interrupter; and an arc fault suppressor.

The figures included herein depict certain components, terminals, and other elements coupled with one another. In the interest of brevity, the related description will rely on the drawing to show which elements are coupled to one another and avoid repetitively reciting which elements are coupled to one another except where doing so may add clarity to the disclosure of a figure. However, it is to be recognized and understood that where the figures show two elements coupled to one another, the coupling of the elements may be a direct coupling, e.g., with a conventional electrical conductor, or may be an operative coupling, e.g., with intervening components which may be irrelevant to the functional coupling of the elements to one another. Moreover, while the figures may illustrate individual components, it is to be recognized and understood that various examples of the systems, arc flash suppressors, and components included in the arc flash suppressors may be distributed components and not restricted, e.g., to a single package or component.

FIG. 1 is a system diagram including an arc flash suppressor 1, in an example embodiment. In various examples, the arc flash suppressor 1 is a single rail, direct current ("DC"), bipolar arc flash suppressor, but it is to be recognized and understood that the principles disclosed with respect to the arc flash suppressor 1 may be applied to any of a variety of configurations of the arc flash suppressor 1, including but not limited to arc flash suppressors that are multiple rail, alternating current ("AC") across a range of low to high frequencies, and/or unipolar. Moreover, while the arc flash suppressor 1 is described in electronic hardware, it is to be recognized and understood that various components may be implemented as logical, firmware, or software components where applicable. Multiple instances of the arc flash suppressor 1 may be utilized in circumstances of selective zoning, as well as circuit zoning and circuit element scaling.

The performance of the arc flash suppressor 1 may be characterized by an arc flash suppression factor. The arc flash suppression factor may be defined as the ratio between the power or radiant flux of an arc flash that is unsuppressed and the power or radiant flux W of an arc flash that is suppressed, or W(unsuppressed)/W(suppressed). Owing to the electronic and timing properties of the arc flash suppressor 1, the arc flash suppressor 1 may have an arc flash suppression factor of 1,000 or more over other devices that attempt to suppress an arc flash. In various examples, the difference in the arc flash suppression factor is because of the capacity of the arc flash suppressor 1 to suppress an arc flash in microseconds rather than milliseconds, thereby reducing the energy released by the arc flash by an approximately proportional amount.

For general operation, the arc flash suppressor 1 may detect plasma ignition, create a short circuit internal to the arc flash suppressor 1 to control the conditions that result in the plasma ignition and a potential arc flash, and then trip a circuit breaker 19. The circuit breaker 19 may clear a resultant electronic over fault condition created by the arc flash suppressor 1, as disclosed herein. In various examples, the circuit breaker 19 may be replaced with or supplemented by an overcurrent protection device, short current protection device, fuse, fusible links, or other suitable components. In the illustrated example, the circuit breaker 19 includes a first power terminal 191, a first control terminal 192, a second power terminal 193, and a second control terminal 194.

The arc flash suppressor 1 and the circuit breaker 19 are coupled between a DC power source 20 and a DC power load 21. The DC power source 20 includes a positive terminal 201 and a negative terminal 202. The DC power load 21 includes a positive terminal 211 and a negative terminal 212. The circuit breaker 19 may be outside of the source loop resistance created by the arc flash suppressor 1, the power source 20, and the power load 21 and consequently may, for the purposes of determining the source loop resistance, be negligible due to the source loop resistance being significantly greater than the negative arc resistance.

At a high level, the arc flash suppressor 1 includes an arc flash suppressor controller 10 and a current sensor 17. These components and their function will be described in detail herein. The arc flash suppressor 1 further includes a first bolted power node 11, a second bolted power node 13, a first source terminal 12, a first load terminal 14, a second source terminal 15, and a second load terminal 16. The arc flash suppressor controller 10 includes a positive power terminal 101, a negative power terminal 103, a first signal input terminal 102, a second signal input terminal 104, a first trip control terminal 1014, and a second trip control terminal 1015. As will be shown herein, the arc flash suppressor controller 10 may include galvanically isolated links and/or connections between two anti-parallel connected bipolar arc flash suppressors and/or arc flash controllers to provide for the capacity of each arc flash suppressor to be aware of what the other arc flash suppressor has detected and is doing to suppress a detected arc flash.

The current sensor 17 includes: a power "K" terminal 171, e.g., a primary power terminal from the power source 20; a sense "k" terminal 172, e.g., a secondary indication of the power from the power source 20 as generated by the current sensor 17; a power "L" terminal 173, e.g., a primary power terminal from the power source 17 to the power load 21; and a sense "l" terminal 174, e.g., a secondary indication of the power to the power load 21 as generated by the current sensor 17. The current sensor 17 may be or may include a current transformer, an inline current sense transformer, a Hall effect current sensor, or any other suitable component or circuit configuration.

Figure 2:
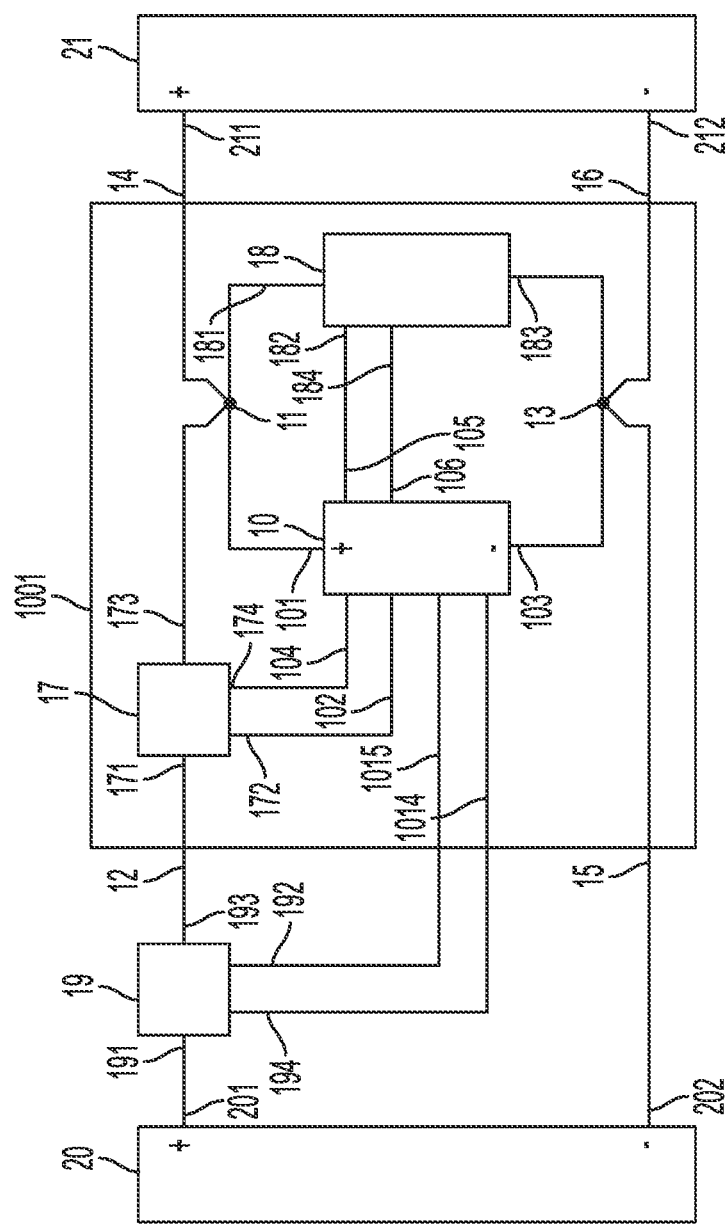
FIG. 2 is a system diagram including an alternative implementation of an arc flash suppressor, in an example embodiment.

FIG. 2 is a system diagram including an alternative implementation of an arc flash suppressor 1001, in an example embodiment. In particular, the arc flash suppressor 1001 is a hybrid arc flash suppressor. The hybrid arc flash suppressor 1001 may incorporate the same components as the arc flash suppressor 1, including the arc flash suppressor controller 10 and the current sensor 17, but also incorporate a triggerable, bistable electro-mechanical ("EM") contact 18. The EM contact 18 includes a first power terminal 181, a first trigger terminal 182, a second power terminal 183, and a second trigger terminal 184. The arc flash suppressor controller 10 may include a triggerable, bistable EM contact first driver terminal 105 and a triggerable, bistable EM contact second driver terminal 106 operatively coupled to the first trigger terminal 182 and second trigger terminal 184, respectively. References numeral included in FIG. 2 but not specifically described here may be identified in FIG. 1.

Figure 3:
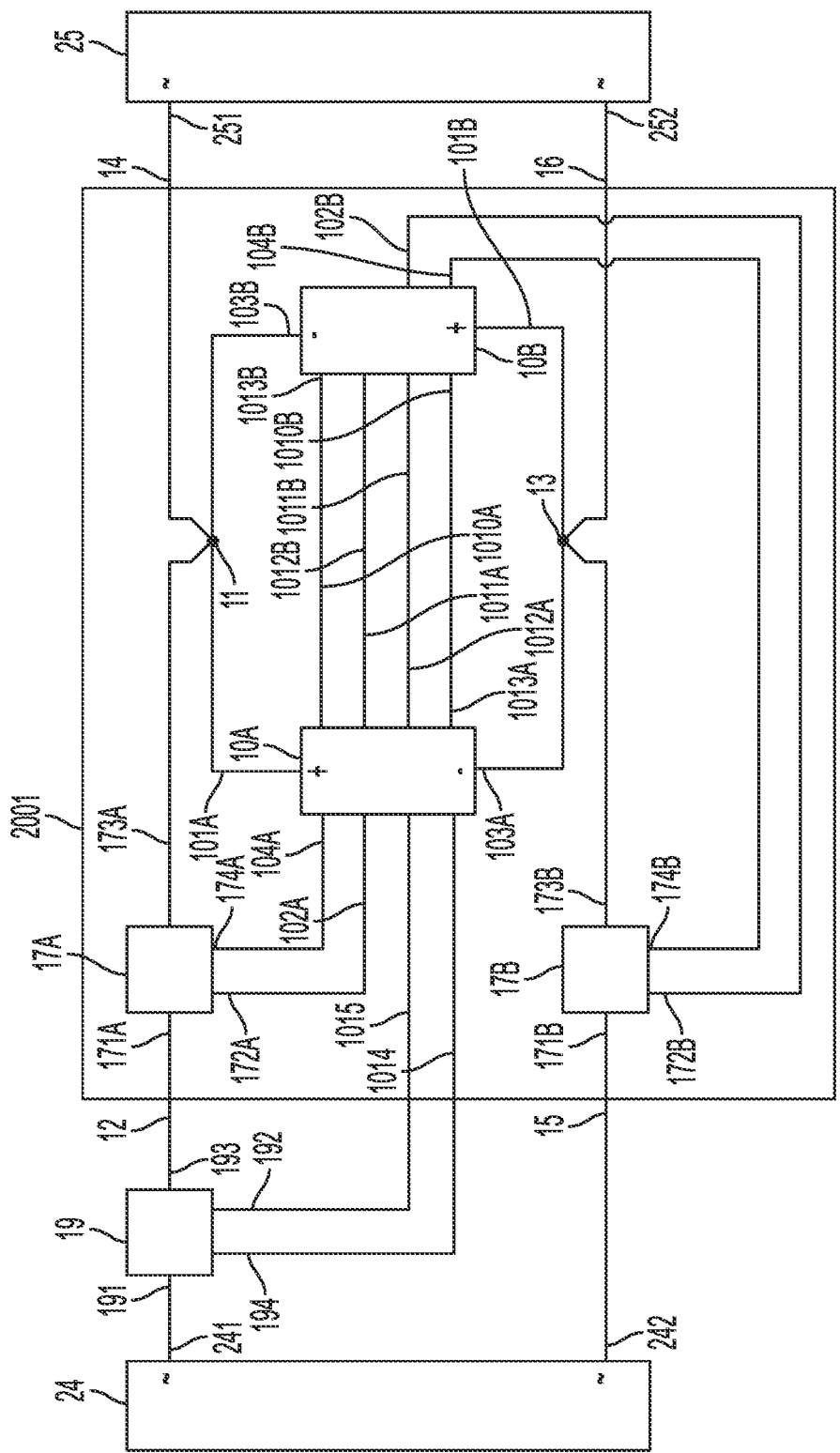
FIG. 3 is a system diagram including an AC arc flash suppressor, in an example embodiment.

FIG. 3 is a system diagram including an AC arc flash suppressor 2001, in an example embodiment. The system of FIG. 3 includes the circuit breaker 19, as well as an AC power source 24, including a first terminal 241 and a second terminal 242, and an AC power load 25, including a first terminal 251 and a second terminal 252.

In various examples, the AC arc flash suppressor 2001 includes components related to those of the arc flash suppressor 1 and arc flash suppressor 1001, including a first bipolar arc flash suppressor controller 10A and a second bipolar arc flash suppressor controller 10B, each relating to the arc flash suppressor controller 10, and a first current sensor 17A and a second current sensor 17B, each relating to the current sensor 17. The first bipolar arc flash suppressor controller 10A and the second bipolar arc flash suppressor controller 10B respectively include: a first power terminal 101A, 101B; a second power terminal 103A, 103B; a first signal input terminal 102A, 102B; a second signal input terminal 104A, 104B; a remote trigger first signal output terminal 1010A, 1010B; a remote trigger second signal output terminal 1011A, 1011B; a remote trigger first signal input terminal 1012A, 1012B; and a remote trigger second signal input terminal 1013A, 1013B. The first bipolar arc flash suppressor controller 10A further includes a first trip control terminal 1014 and a second trip control terminal 1015. The current sensor 17A includes a power "K" terminal 171A, a sense "k" terminal 172A, a power "L" terminal 173A, and a sense "l" terminal 174A while the current sensor 17B includes a power "K" terminal 171B, a sense "k" terminal 172B, a power "L" terminal 173B, and a sense "l" terminal 174B. References numeral included in FIG. 3 but not specifically described here may be identified in FIGS. 1 and/or 2.

In various examples, the first arc flash suppressor controller 10A and the second arc flash suppressor controller 10B are configured to detect current and voltage in opposing domains, e.g., the first arc flash suppressor controller 10A may be configured to detect current and voltage in the positive domain and the second arc flash suppressor controller 10B may be configured to detect current and voltage in the negative domain. Either arc flash suppressor controller 10A, 10B may be configured to detect the conditions indicating an arc flash in their respective domain and cause the arc flash to be suppressed, as disclosed herein. The two arc flash suppressor controllers 10A, 10B may be operatively coupled together to coordinate the suppression of the arc flash, i.e., when one arc flash suppressor controller 10A, 10B detects an arc flash, that arc flash suppressor controller 10A, 10B alerts the other of the detection of the arc flash and the other may also act to extinguish the arc flash in a coordinated manner with the controller 10A, 10B that detected the arc flash.

Figure 4:
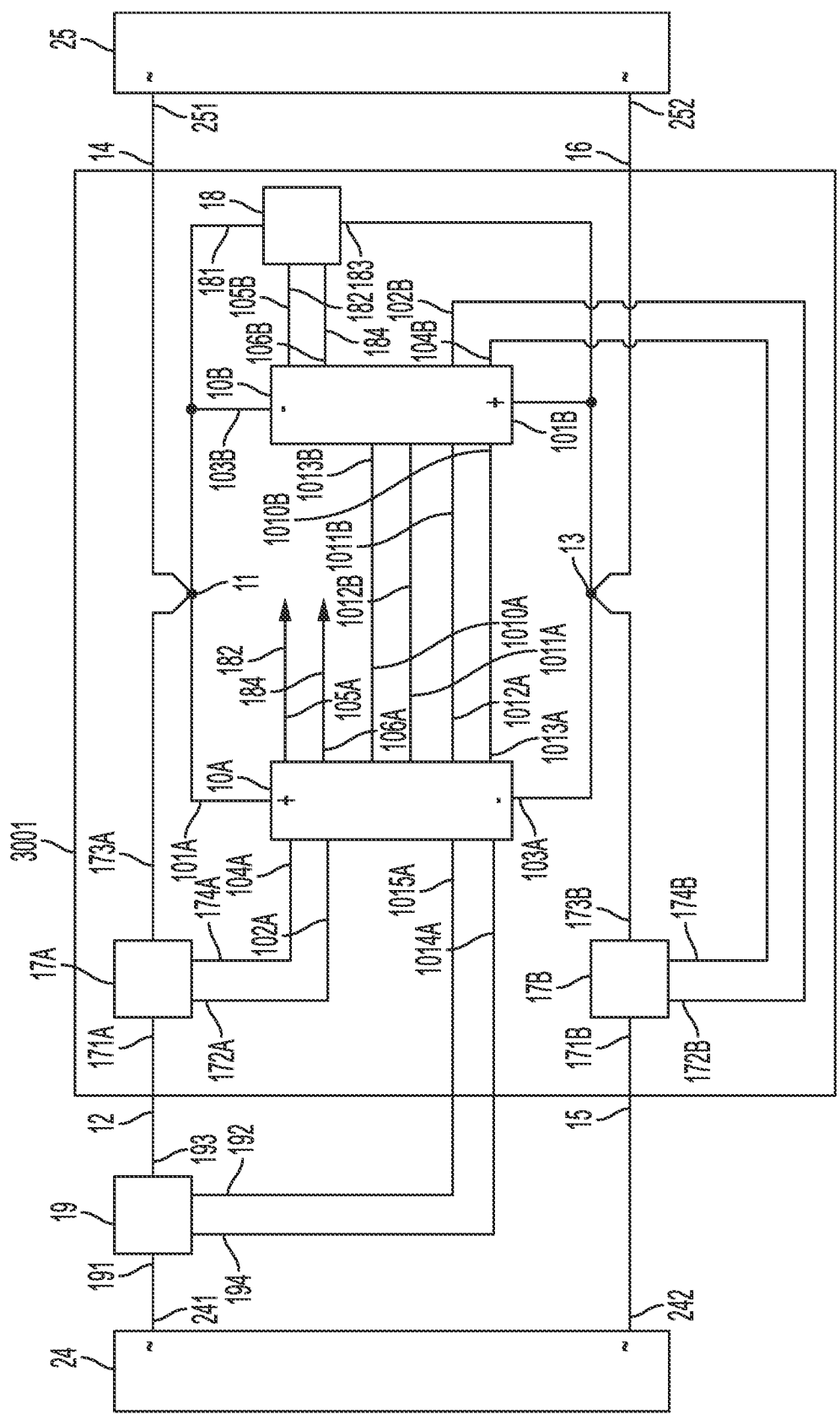
FIG. 4 is a system diagram including an alternative implementation of an AC arc flash suppressor, in an example embodiment.

FIG. 4 is a system diagram including an alternative implementation of an AC arc flash suppressor 3001, in an example embodiment. In particular, the AC arc flash suppressor is a hybrid AC arc flash suppressor. The system of FIG. 4 includes the circuit breaker 19, the AC power source 24, and the AC power load 25 of FIG. 3. The AC arc flash suppressor 3001 includes the same components as the AC arc flash suppressor 2001, including the first arc flash suppressor controller 10A, the second arc flash suppressor controller 10B, the first current sensor 17A, and the second current sensor 17B. The arc flash suppressor 3001 further includes the triggerable, bistable, electro-magnetic ("EM") contact 18, as from the arc flash suppressor 1001. The first arc flash suppressor controller 10A further includes a triggerable, bistable first driver terminal 105A, and the second arc flash suppressor controller 10B further includes a triggerable, bistable first driver terminal 105B, both operatively coupled to the first trigger terminal 182. The first arc flash suppressor controller 10A further includes a triggerable, bistable second driver terminal 106A, and the second arc flash suppressor controller 10B further includes a second triggerable, bistable driver terminal 106B, both operatively coupled to the second trigger terminal 184. References numeral included in FIG. 4 but not specifically described here may be identified in one or more of FIGS. 1-3.

The arc flash suppressor 3001 may have the same or similar function as the arc flash suppressor 2001, except the addition of the EM contact 18. As noted herein, EM contract 18 may provide backup overcurrent protection in the event of a failure of the circuit breaker 19. The arc flash suppressors 1 and 1001 may similarly be modified to incorporate an EM contact 18.

Figure 5:
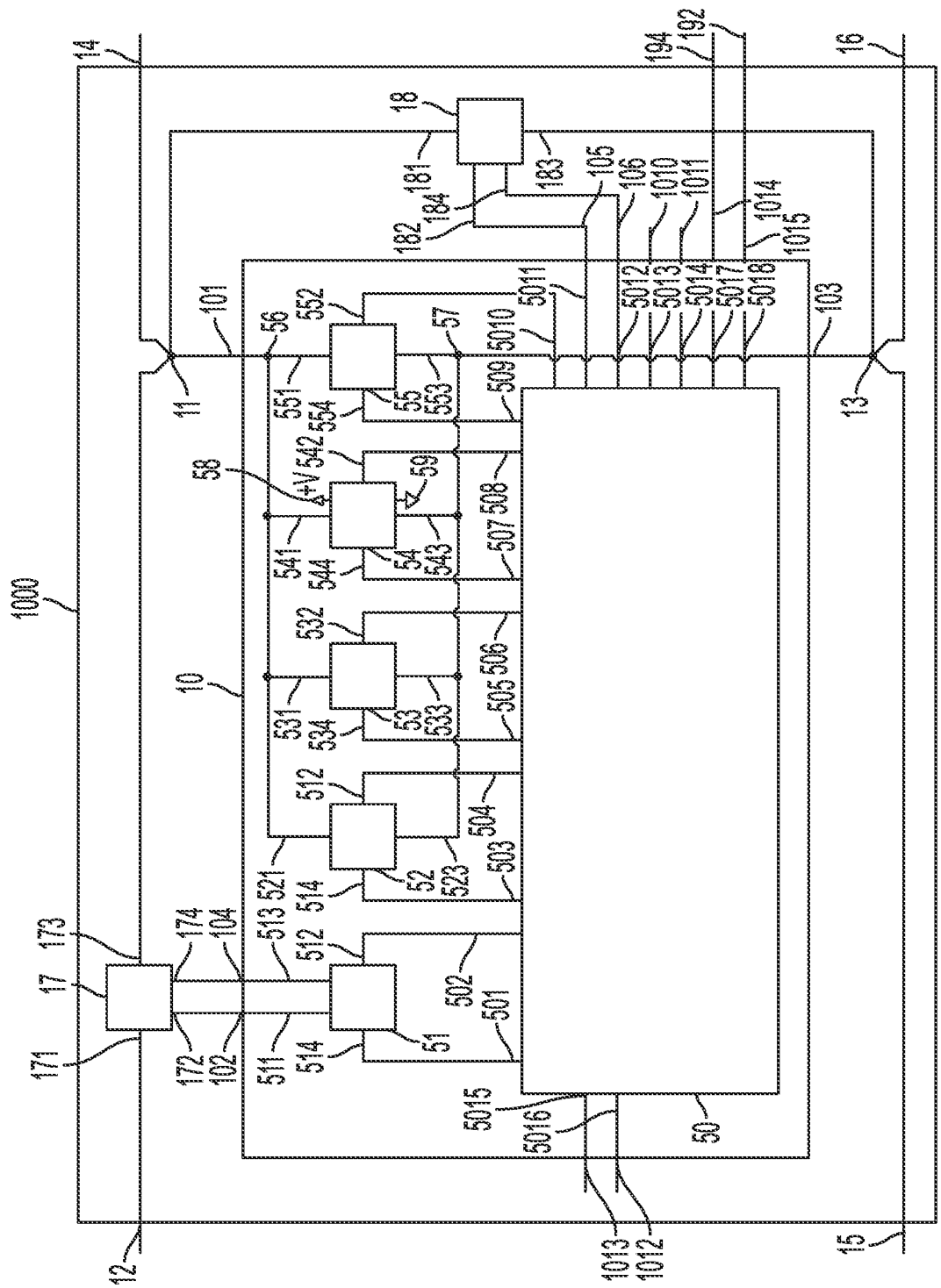
FIG. 5 is a detailed block diagram of an arc flash suppressor and, in particular, an arc flash controller, in an example embodiment.

FIG. 5 is a detailed block diagram of the arc flash suppressor 1001 and, in particular, the arc flash controller 10, in an example embodiment. It is to be recognized and understood that the block diagram of the arc flash controller 10 is merely one possible implementation of the arc flash controller 10 and that any implementation that performs the function of the arc flash controller 10 may be implemented instead of the block diagram of FIG. 5. It is to be further recognized and understood that while the block diagram of FIG. 5 is presented with respect to the arc flash suppressor 1001, the same components in the same connected orientation may be applied as well to the arc flash suppressor 1, with the exclusion of the triggerable, bistable EM contact 18 and the terminals 105, 106 of the arc flash suppressor controller 10 connected to the contact 18, as well as any other components which may apply to the arc flash suppressor 1001 but not to the arc flash suppressor 1, based on the system diagrams of FIGS. 1 and 2 above. Moreover, references numerals included in FIG. 5 but not described in detail here may be described in one more of FIGS. 1-4. It is noted that terminals 1010 and 1011 are included in the interest of completeness but are not, in this diagram, necessarily coupled to another terminal or otherwise utilized, but may be utilized in arc flash suppressors which do utilize such terminals, such as the AC arc flash suppressors 2001, 3001, and related terminals 1010A, 1010B, 1011A, and 1011B.

The arc flash controller 10 includes a main processor 50, a current sensor processor 51, a voltage sensor processor 52, a plasma ignition detector 53, a power supply 54, such as an uninterruptable power supply, a triggerable arc flash extinguishing circuit 55, an anode voltage connection node 56, a cathode voltage connection node 57, a power supply system positive voltage node 58, and a power supply system reference voltage node 59. The nodes 56, 57, 58, and 59 may further be or include a signal tap. While the term "processor" is utilized herein, it is to be recognized and understood that the various processors may be implemented as conventionally understood processors or microprocessors, or as any other configurable or specifically configured chip or system. Such chips or systems include but are not limited to a controller or microcontroller, a custom chip, such as an application-specific integrated circuit ("ASIC"), a field-programmable gate array ("FPGA"), or any other suitable chip or system.

In various examples, the main processor 50 operates to detect an arc flash based on the output from each of the current sensor processor 51, the voltage sensor processor 52, and the plasma ignition detector 53. In such examples, unless each of the systems 51, 52, 53 provide an indication to the main processor 50 of the condition they are each respectively monitoring, the main processor 50 does not register an arc flash. But if each of the systems 51, 52, 53 do provide the indication, then the main processor 50 identifies the arc flash and commands the arc flash extinguishing circuit 55 to create a short circuit condition, as will be disclosed herein.

Moreover, while the various examples herein describe using all three of the current sensor processor 51, the voltage sensor processor 52, and the plasma ignition detector 53, various alternative examples may include the sensor processors 51, 52 but exclude the plasma ignition detector 53. Such examples may be relatively more prone to spoofing owing to the absence of confirmation of plasma ignition, but the arc flash suppressor may nonetheless be effective to detect and suppress arc flashes without the plasma ignition detector 53.

Further, as will be described in detail, while the current sensor processor 51 is based on the detection of current, the voltage sensor processor 52 and the plasma ignition detector 53 are both based on the detection and analysis of voltage, albeit different types of voltage measurement. As such, as described in this disclosure, the voltage sensor processor 52 and the plasma ignition detector 53 are implemented separately and with different types of voltage sensors. However, it is to be recognized and understood that if a voltage sensor is capable of detecting the two different types of conditions detected by the voltage sensor processor 52 and the plasma ignition detector 53, those two systems 52, 53 may be implemented as a single block with a common voltage sensor that is configured to detect both conditions. In such an example, the difference between the voltage sensor processor 52 and the plasma ignition detector 53 may be a logical distinction rather than physical distinct components.

The main processor 50 may generally be understood to be an arc flash initiation detector and includes a current slew rate control output 501, a current slew rate status input 502, a voltage slew rate control output 503, a voltage slew rate status input 504, an arc plasma ignition detection control output 505, an arc plasma ignition detection status input 506, a power supply control output 507, a power supply status input 508, an arc flash extinguishing circuit trigger signal output 509, an arc flash extinguishing circuit status input 5010, an EM contact first trigger signal output 5011, an EM contact second trigger signal output 5012, a remote arc flash suppressor trigger first signal output 5013, a remote arc flash suppressor trigger second signal output 5014, a remote arc flash suppressor trigger first signal input 5015, a remote arc flash suppressor trigger second signal input 5016, a circuit breaker trigger first signal input 5017, and a circuit breaker trigger second signal input 5018. Logically, the main processor 50 comprises an arc flash initiation detector that detects both the distinctive field emission arc initiation voltage profile and the distinctive thermionic emissions arc initiation voltage profile. The main processor 50 may further incorporate self-test or diagnostic routines and the capacity to evaluate its function. Such diagnostic routines may include calibration, set-up, self-test, local command of diagnostic procedures, remote command of diagnostic procedures, and automatic command of diagnostic procedures. The main processor 50 may also manage power-up and power-down sequences for the arc flash suppressor 1 generally.

The main processor 50 may be configured to detect but ignore conditions that do not equate to an arc flash. Thus, the main processor 50 may ignore abnormal power conditions and normal contact arcing, e.g., contact arcs that are located between the power source 20 and the power load 21. The main processor 50 may also detect and confirm the tripping of the circuit breaker 19 and may log the timing of the tripping of the circuit breaker 19.

The arc flash current signal processor 51 includes a "k" lead input 511, a status signal output 512, an "l" lead input 513, and a control signal input 514. The slew rate detector is configured to determine the positive current slew rate and, in particular, when the positive current slew rate meets, exceeds, or transcends a threshold. The arc flash current signal processor 51 may perform slew rate scaling as appropriate and may additionally or alternatively determine actual current, maximum current, minimum current, current root mean squared ("RMS"), and average current, among other potential values related to current.

The voltage signal processor 52 includes a first or "hot" voltage terminal 521, a status signal output 522, a second or "com" voltage terminal 523, and a control signal input 524. The voltage signal processor 52 may function as a negative voltage slew rate detector. The voltage signal processor 52 is configured to determine the negative voltage slew rate and, in particular, when the negative voltage slew rate meets, exceeds, or transcends a threshold. The voltage signal processor 52 may perform slew rate scaling as appropriate and may additionally or alternatively determine actual voltage, maximum voltage, minimum voltage, voltage RMS, and average voltage, among other potential values related to voltage.

The plasma ignition detector 53 includes a "hot" voltage input 531, a status signal output 532, a "com" voltage input 533, and a control signal input 534. The plasma ignition detector 53 is configured to detect the ignition of plasma as disclosed herein based on the input from the main processor 50 obtained based on data received from the arc flash current signal processor 51 and the voltage signal processor 52. Consequently, the plasma ignition detector 53 may be configured to detect and monitor over a timing profile any of the following conditions and output to the main processor 50 information indicative of any of these states: F-arc fault initiation, F-arc plasma ignition, F-arc flash, T-arc fault initiation, T-arc plasma ignition, T-arc flash. The plasma ignition detector 53 may function as a memory or triggerable or settable condition, e.g., by constantly or regularly maintaining and/or outputting the current detected state as detected until another state is detected.

The power supply system 54 includes a "hot" voltage terminal 541, a system status signal output 542, a "com" voltage terminal 543, and a system control signal input 544.

The triggerable arc flash extinguishing circuit 55 includes a "hot" voltage terminal 551, a status signal output 552, a "com" voltage terminal 553, and a trigger signal input 554. The arc flash extinguishing circuit 55 is configured to carry the maximum short circuit current of the power source 20, 24 coupled to the arc flash suppressor 1001. The arc flash extinguishing circuit 55 is thereby configured to convert an arc flash fault condition to a short current fault condition within a period of, e.g., twenty microseconds, which can be controlled without substantial damage to an underlying system until the circuit breaker 19 or other overcurrent protective device can trip and clear the over current condition, e.g., within a period of twenty milliseconds.

Consequently, the arc flash suppressor 1001 translates a chaotic condition, i.e., an arc flash, into a controlled and expected condition, i.e., a short circuit. The arc flash suppressor 1001 has an activation range, e.g., the range of voltage and current conditions in which the arc flash suppressor 1001 activates the arc flash extinguishing circuit 55 to extinguish an arc flash, that is dependent on the resistance of connected circuit elements, e.g., the power source 20, 24 and the power load 21, 25, etc., by the wire gauge by which those circuit elements are connected to the arc flash suppressor 1001, and so forth. The activation range is scalable to the circumstances, e.g., by hardware, software, or firmware, as appropriate, and creates an arc flash protected current loop including the arc flash suppressor 1001 and the connected circuit elements. The arc flash suppressor 1001 may be configurable to specific configurations to provide selective coordination for zone-based arc fault protection and to match the circuit breaker in the specific zone. Consequently, arc flash initiation sensitivity may be scalable to the circumstances of the connected circuit elements.

Multiple arc flash suppressors 1001 may be individually configured to align with multiple protection zones, e.g., ranges of voltage or current values in which the arc flash extinguishing circuit 55 triggers. Thus, in various examples, each arc flash suppressor 1001 may correspond to one zone. The various zones may be non-continuous or continuous in that there may be a zone of voltage or current values between the two activation zones in which the arc flash extinguishing circuit 55 is not triggered. Moreover, the multiple zones may overlap current or voltage values. Consequently, the zones may be related to specific hierarchies within the power hardware distribution architecture enabling the appropriate settings for the arc flash suppressors 1, 1001 and be scalable, configurable, and adaptable to specific arc fault conditions. The arc flash suppressor 1001 provides arc flash protection for multiple inputs, e.g., in the context of an electrical panel off of a power main in a residential or commercial context. In such an example, multiple arc flash suppressors 1001 may provide multiple zones that correspond, e.g., to individual circuit breakers or groups of circuit breakers included in the electrical panel, with the arc flash suppressor 1001 configured to detect currents and voltages relevant to the power characteristics of that zone.

Figure 6:
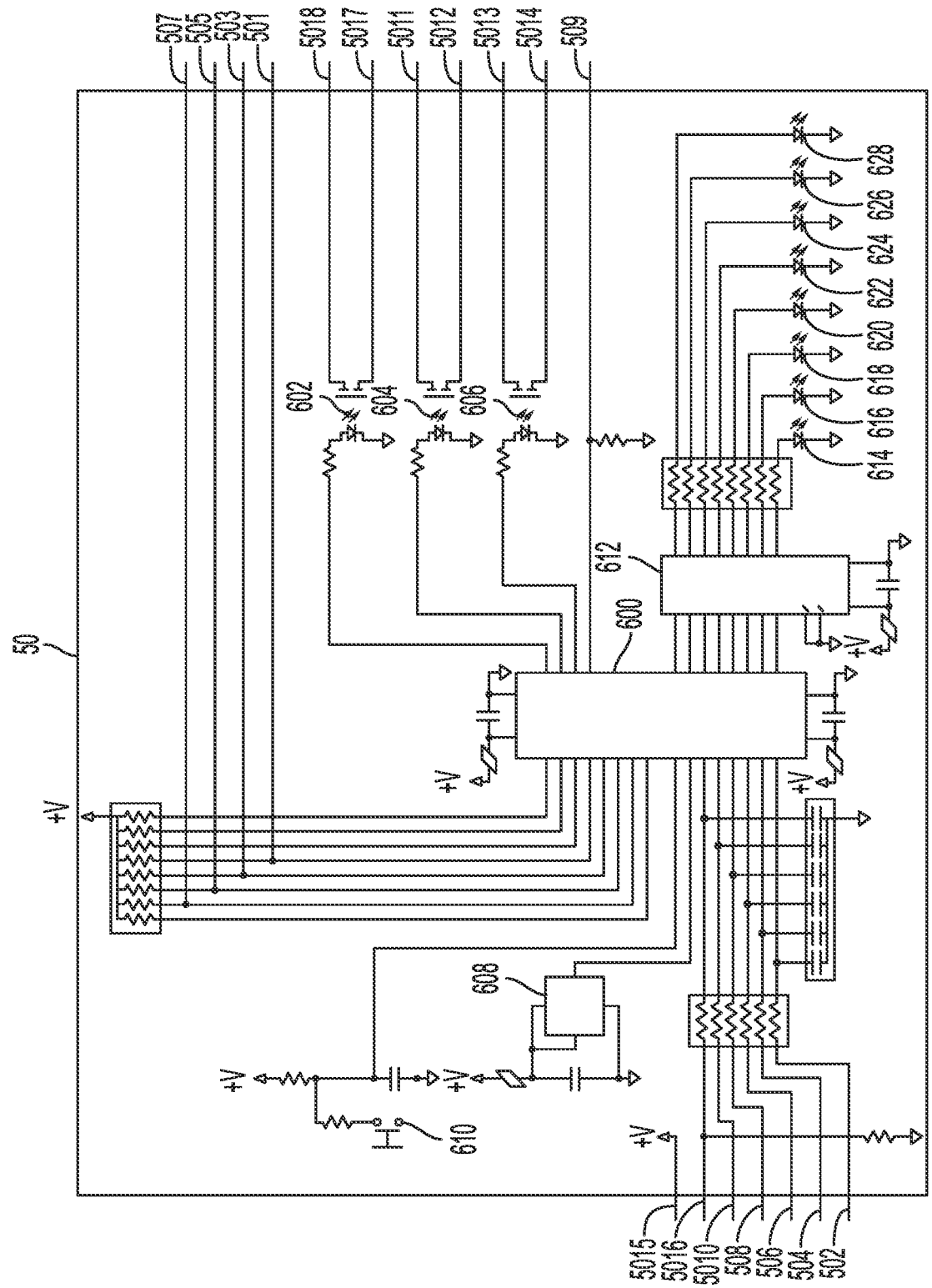
FIG. 6 is a circuit diagram of a main processor, in an example embodiment.

FIG. 6 is a circuit diagram of the main processor 50, in an example embodiment. The circuit diagram is presented as one possible implementation of the main processor 50 and alternative implementations are contemplated.

The main processor 50 includes a main microprocessor 600, a circuit breaker signal isolator 602, an EM contact signal isolator 604, a remote arc flash suppressor signal isolator 606, and a clock generator 608. The main processor 50 further optionally includes a manual reset switch 610 and an output buffer 612 with an associated status indicator array, including a standby indicator 614, a processor heartbeat indicator 616, a critical voltage slew rate detected indicator 618, a critical current slew rate detected indicator 620, an arc flash plasma ignition detected indicator 622, a thermionic emission initiated arc flash detected indicator 624, a field emission initiated arc flash detected indicator 626, and a triggerable arc flash extinguishing circuit triggered indicator 628. Additional status indicators may optionally be included or status indicators listed here may optionally be excluded, as desired.

The main processor 50 may be configured to output information, both at a high level with the status indicator array as well as an electronic data output, e.g., readable by a computer or other electronic device. Thus, the main processor 50 may be configured to communicate according to any suitable wired or wireless communications modality. The main processor 50 may output data logging, including system events such as health, diagnostics, arc flash events, and responses by components of the main processor 50 and controller 10 generally, conditions, logical states and statuses, and so forth.

Figure 7:
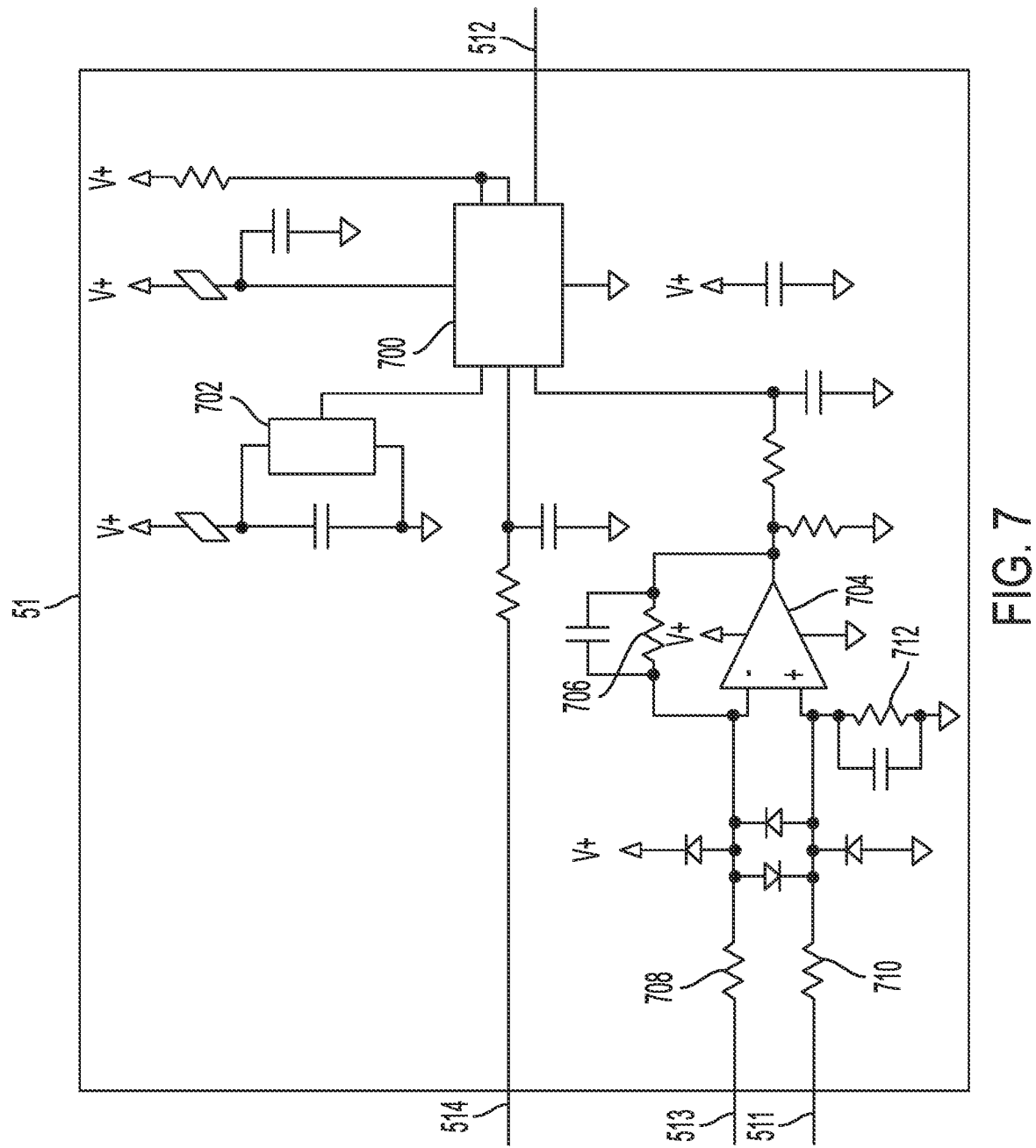
FIG. 7 is a circuit diagram of a current signal processor, in an example embodiment.

FIG. 7 is a circuit diagram of the current signal processor 51, in an example embodiment. The circuit diagram is presented as one possible implementation of the current signal processor 51 and alternative implementations are contemplated.

As noted herein, the arc flash current signal processor 51 includes a "k" lead or primary input 511, a status signal output 512, an "l" lead or secondary input 513, and a control signal input 514. The current signal processor 51 further includes a current slew rate detector 700, a clock 702, and an operational amplifier 704, with associated resistors, including a first feedback loop gain setting resistor 706, a first input current limiting and gain setting resistor 708, a second input current limiting and gain setting resistor 710, and a second feedback loop gain setting resistor 712. In an example in which the power source 20, 24 has a six hundred eighty (680) Volt peak, the gain may be an attenuation, i.e., a negative gain, to reduce the signal to, e.g., less than five (5) Volts. In such an example, the gain may be negative one thousand (1,000).

In various examples, the current slew rate detector 700 is configured to detect both the change in current and the absolute current level. The following example critical current slew rates are presented for various supply current levels by way of illustration and not limitation, and other current slew rates may be applied based on these principles: at 200 A, the short circuit current slew rate may be 1.29 mega-amps per second; at 2 kA, the short circuit current slew rate may be 12.9 mega-amps per second; at 20 kA, the short circuit current slew rate may be 129 mega-amps per second; at 200 kA, the short circuit current slew rate may be 1,290 mega-amps per second.

Figure 8:
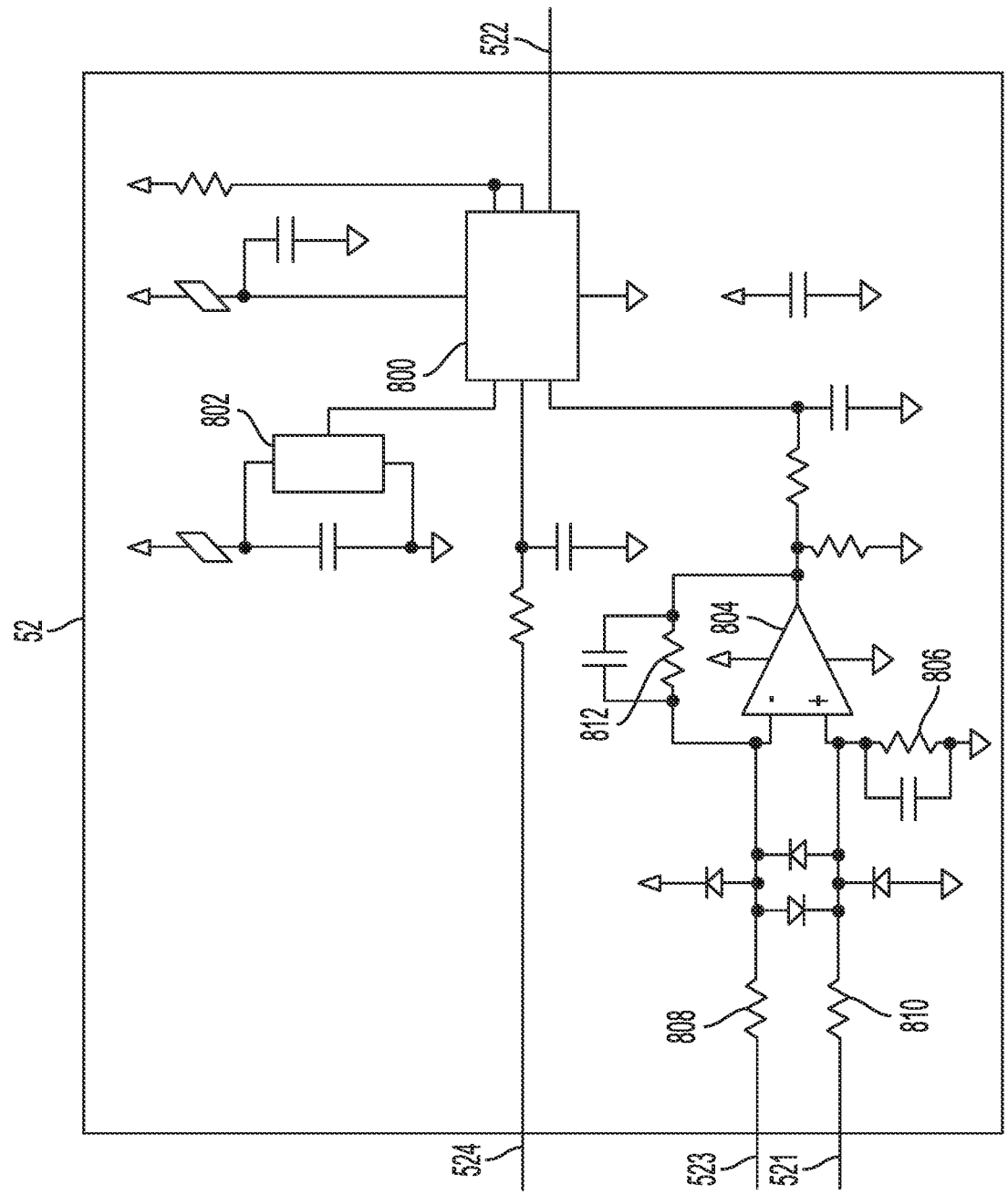
FIG. 8 is a circuit diagram of a voltage signal processor, in an example embodiment.

FIG. 8 is a circuit diagram of the voltage signal processor 52, in an example embodiment. The voltage signal processor 52 may be configured to function as a critical arc flash voltage slew rate detector. The circuit diagram is presented as one possible implementation of the voltage signal processor 52 and alternative implementations are contemplated.

As noted here, the voltage signal processor includes a first or "hot" voltage terminal 521, a status signal output 522, a second or "com" voltage terminal 523, and a control signal input 524. The voltage signal processor 52 further includes a voltage slew rate detector 800, a clock 802, and an operational amplifier 804 with associated resistors, including a first feedback loop gain setting resistor 806, a first input current limiting and gain setting resistor 808, a second input current limiting and gain setting resistor 810 and a second feedback loop gain setting resistor 812. The gain may be the same gain as indicated above with respect to FIG. 7.

In various examples, the voltage slew rate detector 800 may detect both a change in voltage and an absolute voltage level. The following example critical voltage slew rates are presented for various supply voltage levels by way of illustration and not limitation, and other voltage slew rates may be applied based on these principles: at 240Vac, the line voltage slew rate may be −5 megavolts per second; at 480Vac, the line voltage slew rate may be −10 megavolts per second; at 960Vac, the line voltage slew rate may be −20 megavolts per second; at 1,920Vac, the line voltage slew rate may be −40 megavolts per second.

Figure 9:
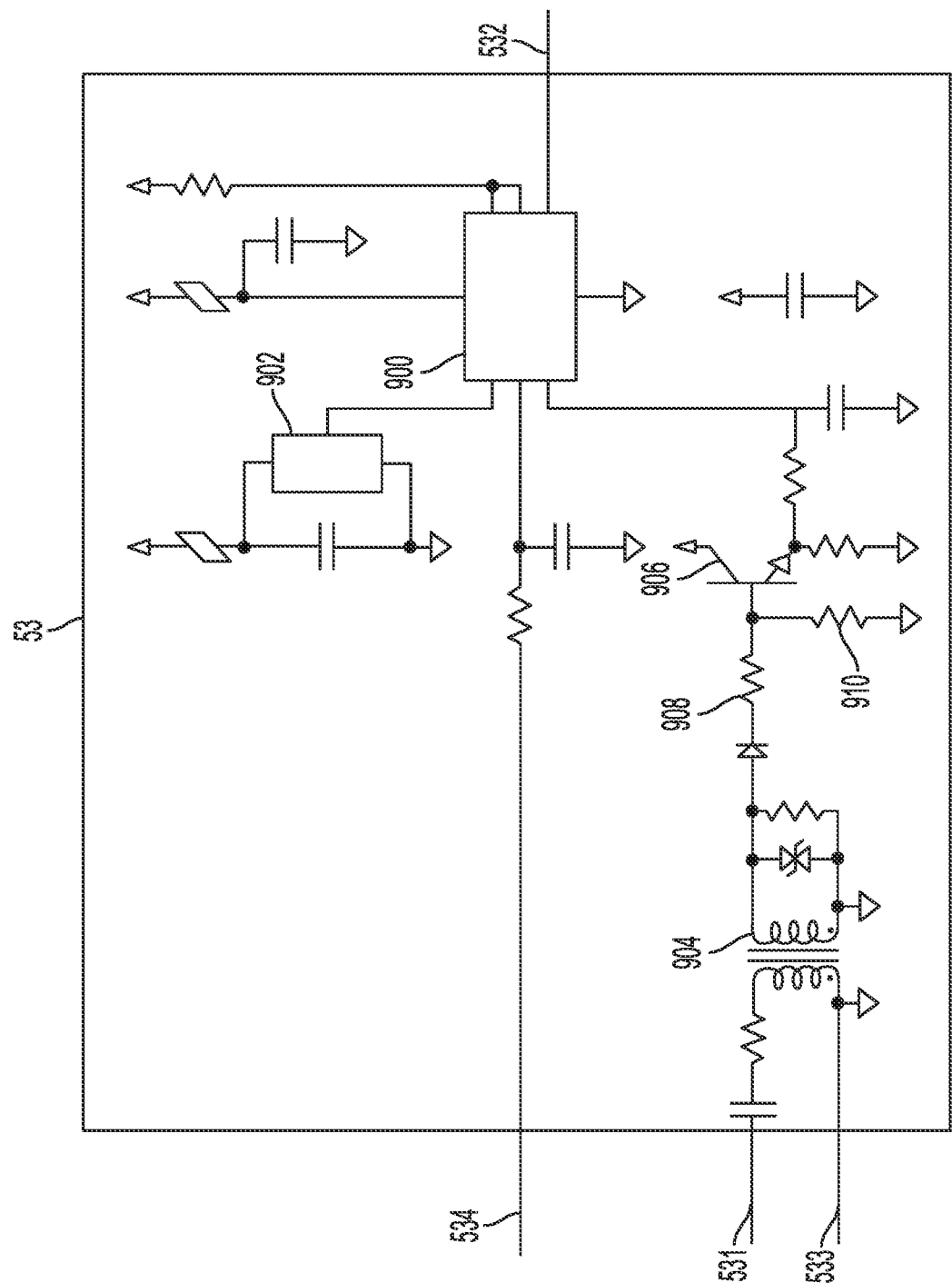
FIG. 9 is a circuit diagram of the plasma ignition detector, in an example embodiment.

FIG. 9 is a circuit diagram of the plasma ignition detector 53, in an example embodiment. The circuit diagram is presented as one possible implementation of the plasma ignition detector 53 and alternative implementations are contemplated.

As noted herein, the plasma ignition detector 53 includes a "hot" voltage input 531, a status signal output 532, a common or reference voltage input 533, and a control signal input 534. The plasma ignition detector 53 further includes a voltage edge to pulse converter 900, a clock 902, a pulse coupling and signal isolating transformer 904, and a pulse detector including transistor 906, such as an NPN bipolar junction transistor, and a voltage divider formed by resistors 908 and 910. The voltage edge to pulse converter 900 may output a signal on the status signal output 532 when the input voltage as measured over the voltage inputs 531 and 533 has an edge that as a rise or fall rate that meets or exceeds a relatively fast slew rate, e.g., one hundred thousand (100,000) Volts per second. The edge to pulse converter 900 may be agnostic about absolute voltage levels, in contrast to the voltage slew rate detector 800 in FIG. 8.

Figure 10:
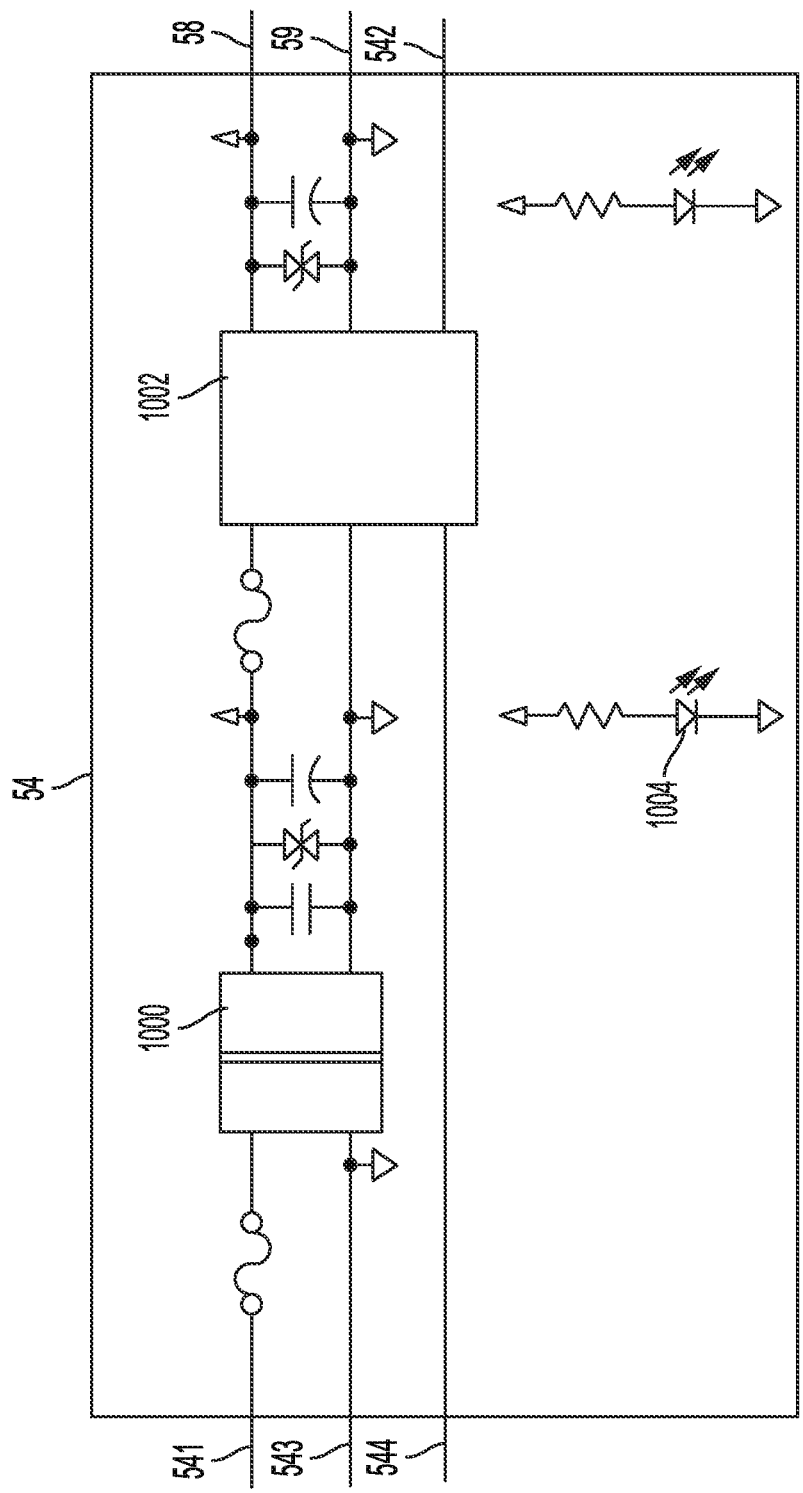
FIG. 10 is a circuit diagram of the power supply system, in an example embodiment.

FIG. 10 is a circuit diagram of the power supply system 54, in an example embodiment. The circuit diagram is presented as one possible implementation of the power supply system 54 and alternative implementations are contemplated.

As noted herein, the power supply system 54 includes a "hot" voltage terminal 541, a system status signal output 542, a "com" voltage terminal 543, and a system control signal input 544. The power supply system 54 further includes the positive voltage node 58 and reference voltage node 59. The power supply system 54 further includes an AC to DC converter 1000 and a DC to DC converter 1002. The power supply system 54 further optionally includes a status indicator array including an AC to DC converter 1000 status indicator 1004 and a DC to DC converter 1002 status indicator 1006.

Figure 11:
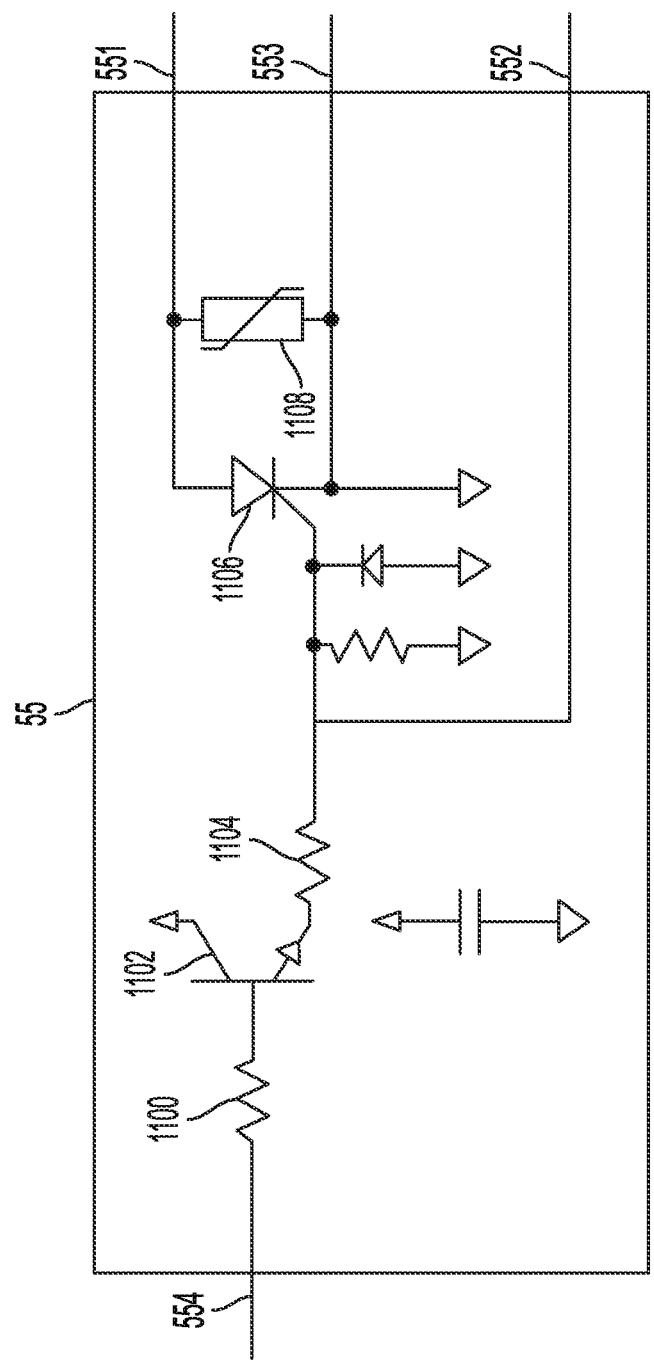
FIG. 11 is a circuit diagram of the arc flash plasma extinguisher, in an example embodiment.

FIG. 11 is a circuit diagram of the arc flash plasma extinguisher 55, in an example embodiment. The circuit diagram is presented as one possible implementation of the arc flash plasma extinguisher 55 and alternative implementations are contemplated.

As noted herein, the arc flash extinguishing circuit 55 includes a "hot" voltage terminal 551, a status signal output 552, a "com" voltage terminal 553, and a trigger signal input 554. The arc flash extinguishing circuit 55 further includes a gate limiting resistor 1100 coupled to the gate of a signal switching bipolar junction transistor 1102, which is coupled to a gate current limiting resistor 1104, which is coupled to a triggerable semiconductor 1106, such as a silicon-controlled rectifier ("SCR"). An overvoltage protection circuit 1108 is coupled across the rectifier 1106. The overvoltage protection circuit 1108 may be a MOV, an SCR with a dielectric high enough to differ from the rectifier 1106, or any other suitable component.

Figure 12:
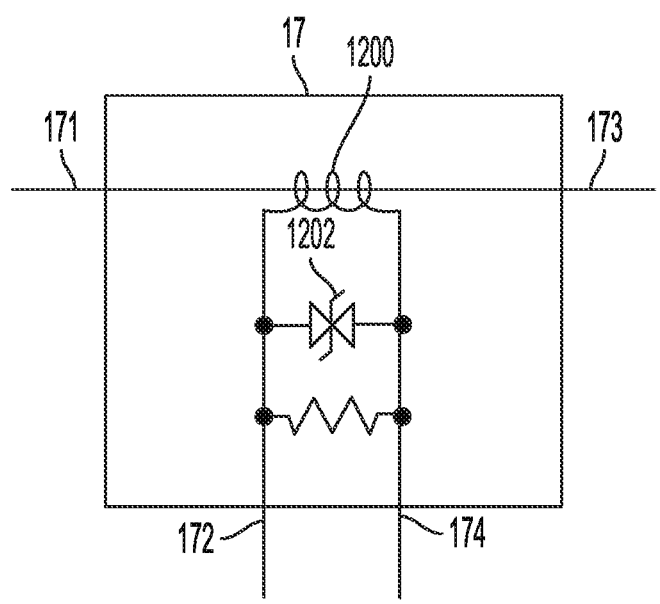
FIG. 12 is a circuit diagram of the current sensor, in an example embodiment.

FIG. 12 is a circuit diagram of the current sensor 17, in an example embodiment. The circuit diagram is presented as one possible implementation of the current sensor 17 and alternative implementations are contemplated. While a specific configuration is presented here based on a current transformer 1200, the current sensor 17 may be or may include an inline current sense transformer, a Hall effect current sensor, or any other suitable component or circuit configuration instead of or in addition to the current transformer 1200.

As noted above, the current sensor 17 includes a power "K" terminal 171, a sense "k" terminal 172, a power "L" terminal 173, and a sense "l" terminal 174. The current transformer CXF1 is coupled between the power "K" terminal 171 and the power "L" terminal 173. A diode 1202, such as a unipolar transient voltage suppressor diode, and a termination resistor R3 are coupled in parallel with the current transformer CXF1.

Figure 13:
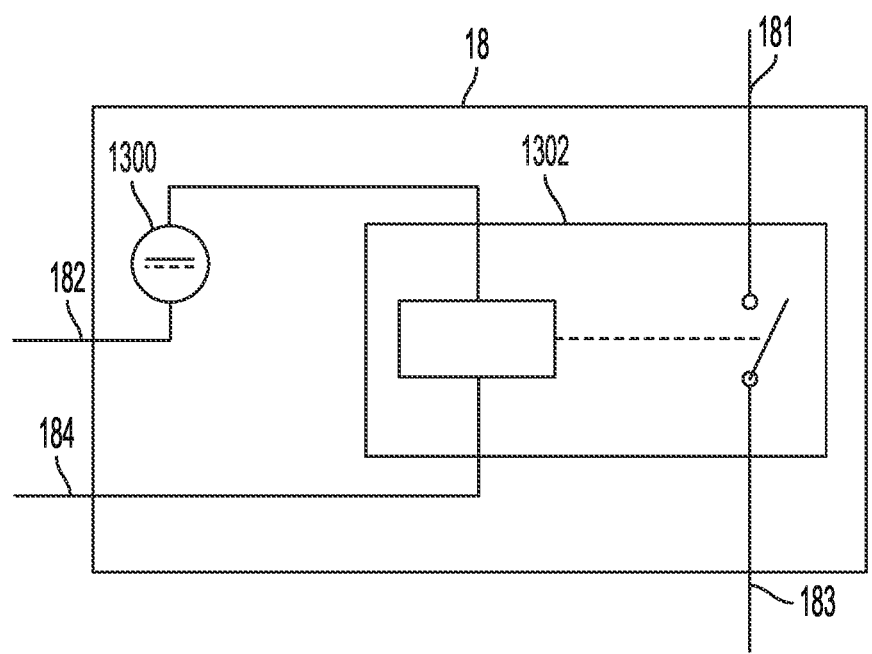
FIG. 13 is a circuit diagram of the EM contact, in an example embodiment.

FIG. 13 is a circuit diagram of the EM contact 17, in an example embodiment. The circuit diagram is presented as one possible implementation of the EM contact 17 and alternative implementations are contemplated. Moreover, the EM contact 17 may be considered an optional component for providing further safety functionality.

As noted above, the EM contact 17 includes a first power terminal 181, a first trigger terminal 182, a second power terminal 183, and a second trigger terminal 184. The EM contact 17 further includes a DC power supply 1300 coupled to the first trigger terminal 182 and a triggerable EM contact 1302 coupled to the DC power supply 1300 and between the first power terminal 181 and the second power terminal 183. In various examples, the main processor 50 may cause the EM contact 17 to switch or trigger in the event of a failure of the circuit breaker 19 following the triggering of the arc flash plasma extinguisher 55.

Figure 14:
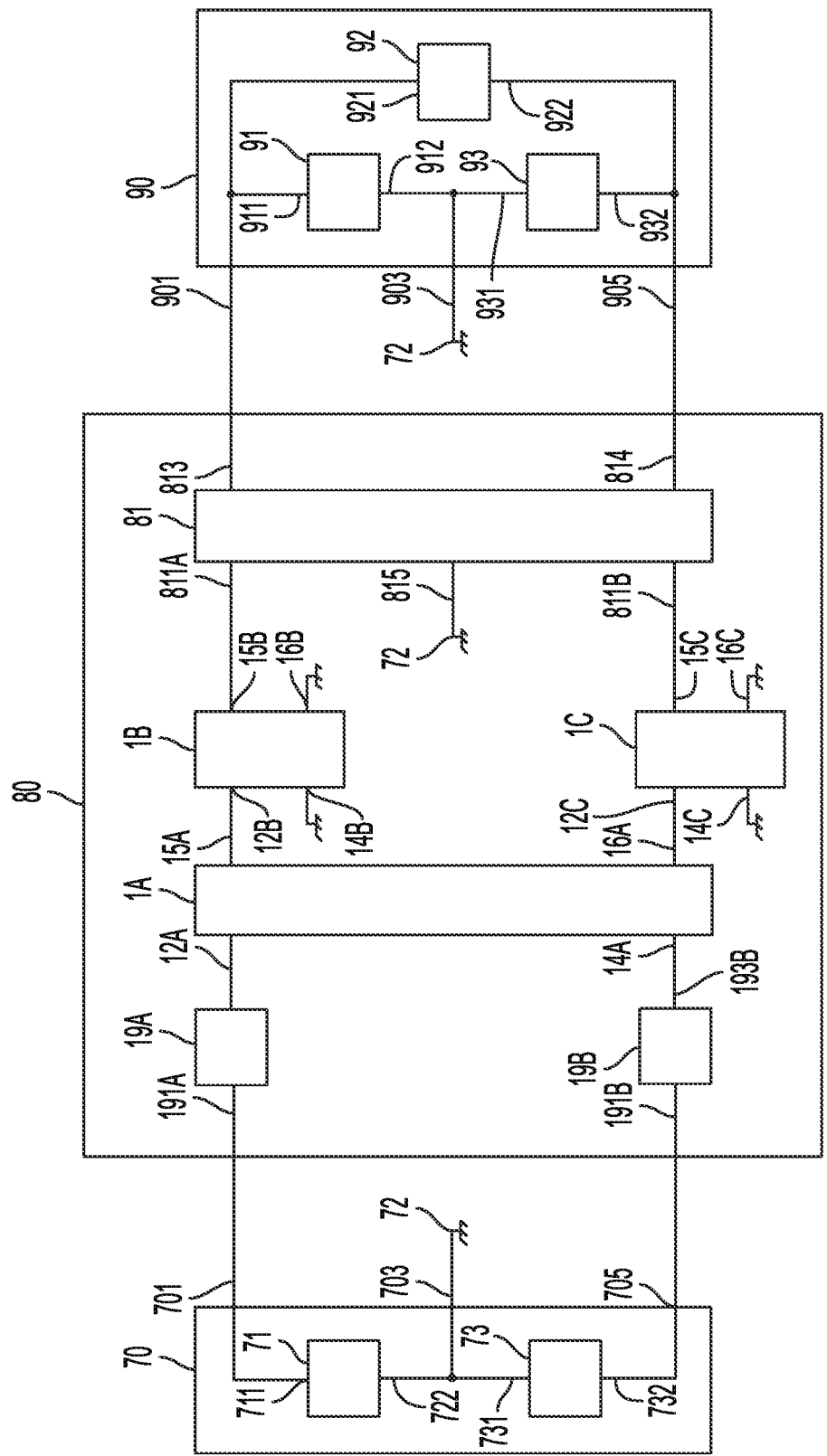
FIG. 14 is a block diagram of a system incorporating multiple arc flash suppressors, in an example embodiment.

FIG. 14 is a block diagram of a system incorporating multiple arc flash suppressors 1, 1001, 2001, 3001, in an example embodiment. The system may function as an arc flash protected split circuit AC or dual rail DC power service system, in an example embodiment, and may select specific ones of the arc flash suppressors 1, 1001, 2001, 3001 disclosed herein. The system includes a power source 70, such as a split-phase AC or dual rail DC power source, a power panel 80, such as a split-phase AC or dual rail DC power panel, and a power load 90, such as a split-phase AC or dual rail DC power load. The system is provided to illustrate a circumstance in which multiple arc flash suppressors 1, 1001, 2001, 3001 may be incorporated into a single system and is provided without limitation. Consequently, while the system is illustrated with three arc flash suppressors 1, it is to be recognized that the number and type of arc flash suppressors may be adapted as appropriate to the circumstances of their use.

The power panel 80 includes a first circuit breaker 19A, a second circuit breaker 19B, a power management system 81, and first, second, and third arc flash suppressors 1A, 1B, 1C. Each circuit breaker 19A, 19B includes a first power terminal 191A, 191B, respectively, and a second power terminal, 193A, 193B, respectively. Each arc flash suppressor 1A, 1B, 1C includes a first source terminal 12A, 12B, 12C, a first load terminal 14A, 14B, 14C, a second source terminal 15A, 15B, 15C, and a second load terminal 16A, 16B, 16C, respectively. The power management system 81 includes a first source terminal 811A, a second source terminal 811B, a first load terminal 813, a second load terminal 814, and a neutral terminal 815.

The first arc flash suppressor 1A is coupled to the first circuit breaker 19A at the first source terminal 12A and to the second circuit breaker 19B at the first load terminal 14A. The first arc flash suppressor 1A is coupled to the second arc flash suppressor 1B between the source terminal 15A and the source terminal 12B, respectively, and to the third arc flash suppressor 1C between the second load terminal 16A and the first source terminal 12C, respectively. The second arc flash suppressor 1B is coupled to the power management system 81 between the second source terminal 15B and the first source terminal 811A. The third arc flash suppressor 1C is coupled to the power management system 81 between the second source terminal 15C and the second source terminal 811B.

The power source 70 includes a first power source 71 and a second power source 73 as well as a first terminal 701, a neutral terminal 703, and a second terminal 705. The first and second power sources 71, 73 are both either AC or DC power sources and include first connections 711, 731, and second connections 722, 732, respectively.

The power load 90 includes a first power load 91, a second power load 92, and a third power load 93, each either an AC or DC power load, as well as a first terminal 901, a neutral terminal 903, and a third terminal 905. The first, second, and third power loads 91, 92, and 93, each includes a first terminal 911, 921, 931, and a second terminal 912, 922, 932, respectively.

Figure 15A:
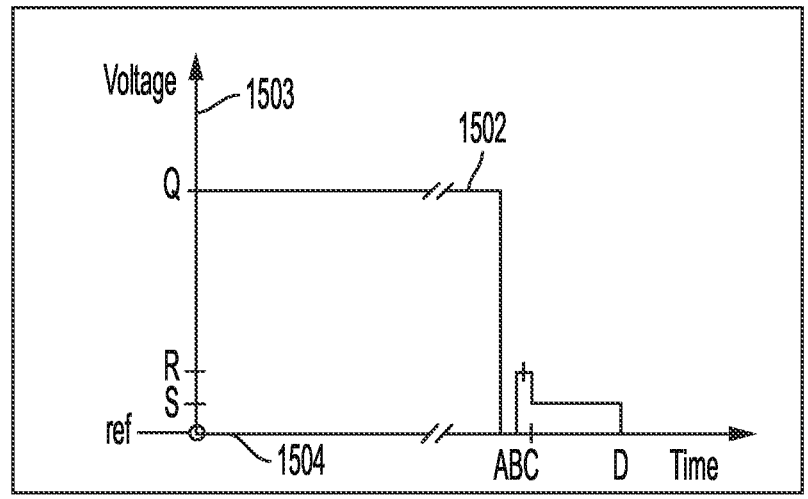
FIGS. 15A and 15B are timing diagrams of a thermionic arc flash (T-arc flash) suppression voltage profile in the voltage and current domains, respectively, in an example embodiment.
Figure 15B:
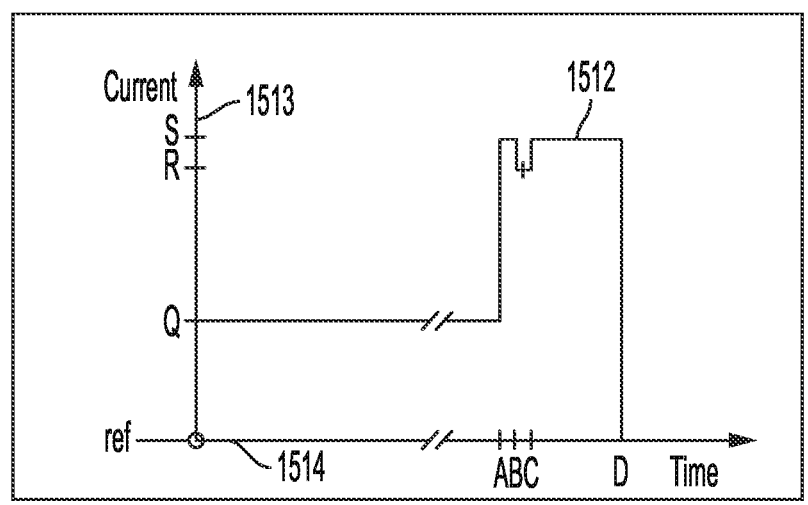

FIGS. 15A and 15B are timing diagrams of a thermionic arc flash (T-arc flash) suppression voltage profile in the voltage and current domains, respectively, in an example embodiment. Thus, both timing diagrams illustrate what happens in the voltage and current domains, respectively, when one or more of the arc flash suppressors 1, 1001, 2001, 3001 operate to suppress a T-arc flash. FIG. 15A includes an X-axis 1504 for time and a Y-axis 1503 for voltage and a line 1502 for measured voltage, e.g., at the voltage signal processor 52 and, in particular, at the terminals 521, 523 (see FIG. 5). FIG. 15B includes an X-axis for time 1514, a Y-axis 1513 for current, and a line 1512 for measured current, e.g., at the current signal processor 51 and, in particular, at the terminals 511, 513.

On each timing diagram, the point Q corresponds to a normal operation voltage/current level. The point R on the Y-axis 1503 corresponds to a T-arc flash fault voltage/current level. The point S on the Y-axis 1503 corresponds to a short circuit fault voltage/current level. On each timing diagram, at A, a short circuit has occurred, e.g., because metallic contact has been made at a pair of contacts, resulting in a high negative voltage slew rate and a high positive current slew rate, and a voltage at a short circuit fault level. At the interval between A and B, the metallic contact results in the voltage being maintained near zero and the current at near short circuit levels. At B, metallic arc flash plasma ignition occurs at the T-arc flash voltage and near the short circuit current. At the interval between B and C, metallic arc flash plasma burns at the arc voltage and near the short circuit current for a few microseconds. At C, the arc flash suppressor 1 detects the T-arc flash and extinguishes the T-arc flash plasma burn within, e.g., ten to fifty microseconds. At the interval between C and D, a short circuit voltage is created for, e.g., twenty milliseconds before the circuit breaker 19 reaches its trip point. At D, the circuit breaker 19 trips and clears the short circuit fault condition.

Figure 16A:
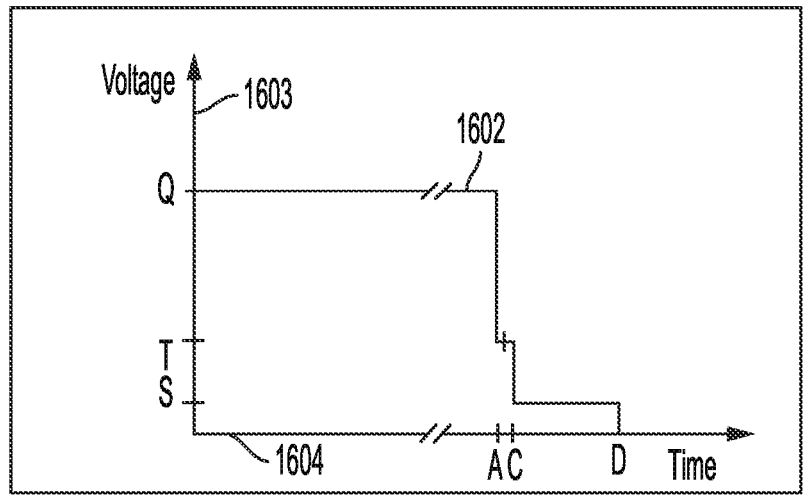
FIGS. 16A and 16B are timing diagrams of an electronic field emission arc flash (F-arc flash) suppression profile in the voltage and current domains, respectively, in an example embodiment.
Figure 16B:
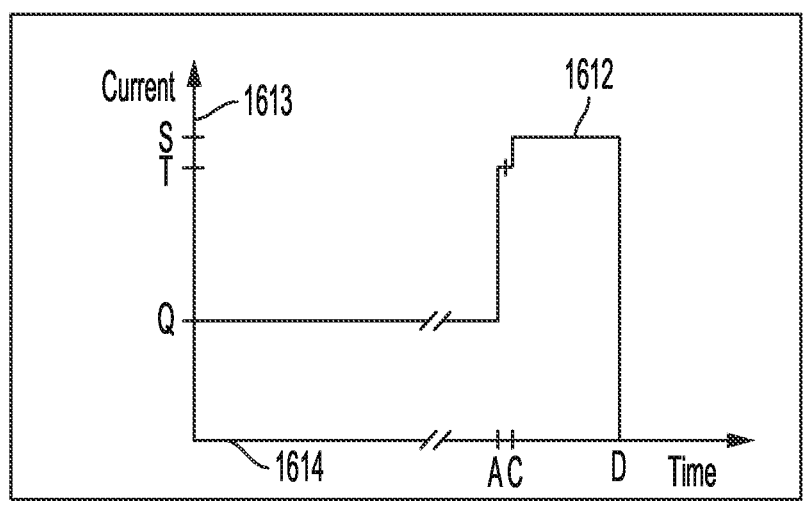

FIGS. 16A and 16B are timing diagrams of an electronic field emission arc flash (F-arc flash) suppression profile in the voltage and current domains, respectively, in an example embodiment. Thus, both timing diagrams illustrate what happens in the voltage and current domains, respectively, when one or more of the arc flash suppressors 1, 1001, 2001, 3001 operate to suppress an F-arc flash. FIG. 16A includes an X-axis 1604 for time and a Y-axis 1603 for voltage and a line 1602 for measured voltage, e.g., at the voltage signal processor 52 and, in particular, at the terminals 521, 523 (see FIG. 5). FIG. 15B includes an X-axis for time 1614, a Y-axis 1613 for current, and a line 1612 for measured current, e.g., at the current signal processor 51 and, in particular, at the terminals 511, 513.

On each timing diagram, the point Q corresponds to a normal operation voltage/current level. The point T on the Y-axis 1503 corresponds to an F-arc flash fault voltage/current level. The point S on the Y-axis 1503 corresponds to a short circuit fault voltage/current level. On each timing diagram, at A, a short circuit has occurred because of dielectric breakdown, resulting in a high negative voltage slew rate and a high positive current slew rate, flash over, and a voltage/current near the short circuit fault level. At the interval between A and C, gaseous F-arc flash plasma burns at the F-arc voltage and near the short circuit current for, e.g., ten to fifty microseconds. At C, the arc flash suppressor 1 detects the F-arc flash and extinguishes the F-arc flash plasma burn, e.g., within ten to fifty microseconds. At the interval between C and D, the short circuit voltage and the current present for, e.g., twenty milliseconds until the circuit breaker 19 reaches the trip point. At D, the circuit breaker 19 trips and clears the short circuit fault condition.

Figure 17A:
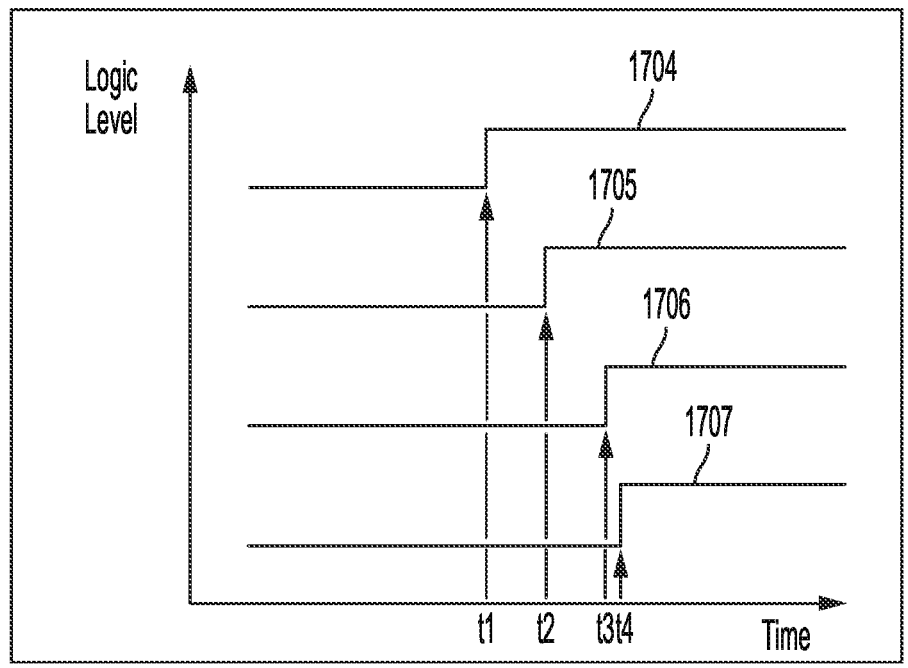
FIGS. 17A and 17B are logic timing diagrams of two sequences by which an arc flash may be detected and suppressed by an arc flash suppressor, in an example embodiment.
Figure 17B:
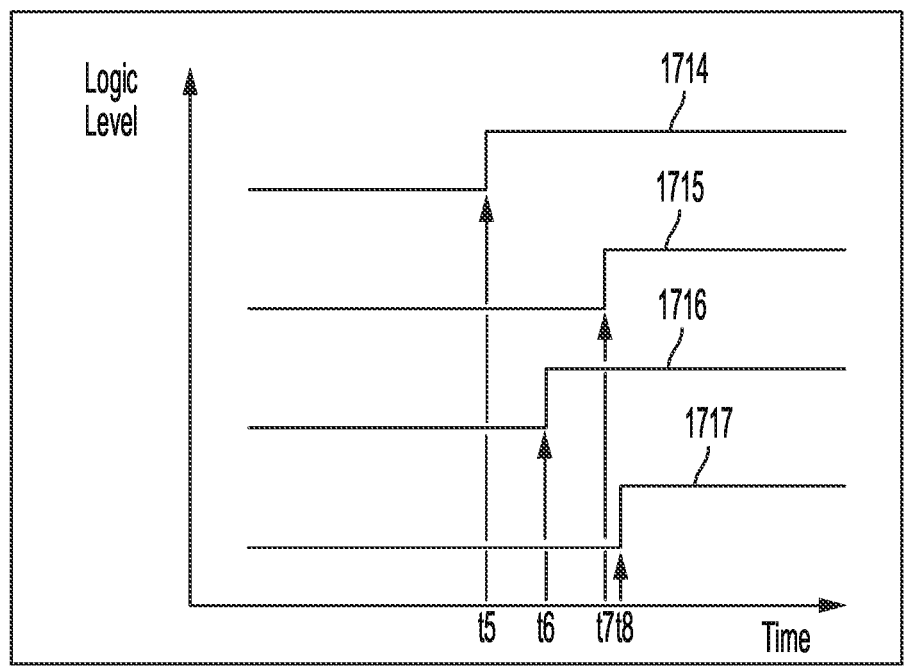

FIGS. 17A and 17B are logic timing diagrams of two sequences by which an arc flash may be detected and suppressed by an arc flash suppressor, in an example embodiment. In each operation, the main processor 50 of the arc flash suppressor 1, 1001, 2001, 3001 sends relevant information to the components noted, receives information from those components, and transmits relevant instructions as appropriate. In particular, FIGS. 17A and 17B illustrate two possible but non-limiting examples of the sequence by which the current signal processor 51, the voltage sensor processor 52, and the plasma ignition detector 53 may detect their respective conditions and output the indication of those conditions to the main processor 50 and which the main processor 50 may still identify as an arc flash.

In FIG. 17A, at t1, arc flash ignition 1704 is detected by the plasma ignition detector 53. At t2, a negative critical voltage slew rate of 1705 is detected by the voltage sensor processor 52. At t3, a positive critical current slew rate 1706 is detected by the current signal processor 51. At t4, the arc flash plasma extinguishing circuit 55 is triggered 1707 by the main processor 50, extinguishing the arc flash.

In FIG. 17B, at t5 arc flash ignition 1714 is detected by the plasma ignition detector 53. At t6, a positive critical current slew rate 1716 is detected by the current signal processor 51. At t7, a negative critical voltage slew rate 1715 is detected by the voltage sensor processor 52. At t8, the arc flash plasma extinguishing circuit 55 is triggered 1717 by the main processor 50, extinguishing the arc flash.

The different sequences between FIGS. 17A and 17B may owe to a variety of factors, ranging peculiarities with the circumstances by which the arc flash forms to latency introduced by the arc flash suppressor 1 or by the system generally. Nonetheless, in an example, the main processor 50 may identify an arc flash if all of the current signal processor 51, the voltage sensor processor 52, and the plasma ignition detector 53 have indicated the existence of their respective condition within a period of, e.g., sixty-six (66) microseconds.

Figure 18A:
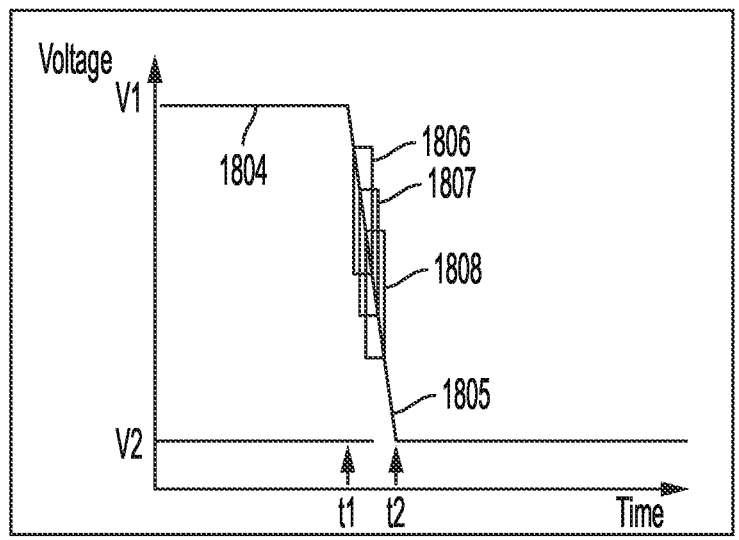
FIGS. 18A and 18B are timing diagrams of a sliding window for detecting a critical voltage slew rate and a critical current slew rate, respectively, in an example embodiment.
Figure 18B:
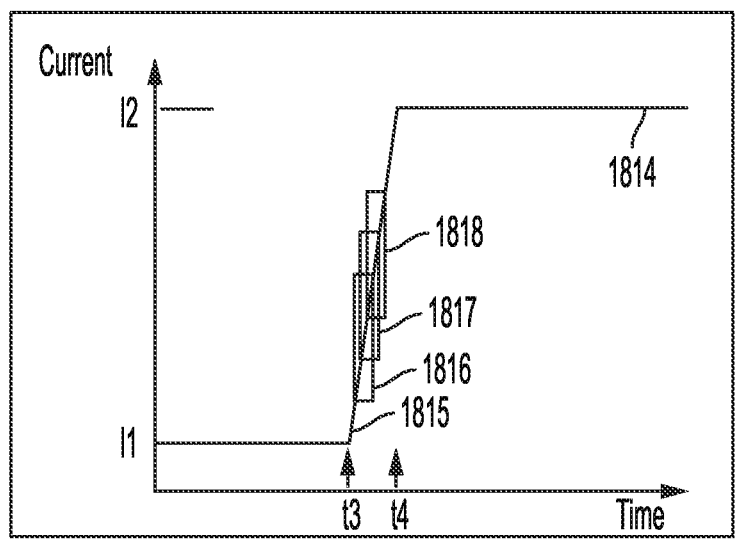

FIGS. 18A and 18B are timing diagrams of a sliding window for detecting a critical voltage slew rate and a critical current slew rate, respectively, in an example embodiment. While the timing diagrams provide one example implementation of identifying voltage and current slew rates, it is to be recognized and understood that any suitable mechanism for identifying the critical voltage and current slew rates may be implemented.

In FIG. 18A, at 1804, voltage is present at a normal condition V1 until time t1, at which point the voltage drops toward the fault condition V2. At 1805, the voltage continues to decrease and approaches the fault condition. At 1806 the voltage sensor processor 52 determines the first negative voltage slew rate. At 1807, the voltage sensor processor 52 determines the second negative voltage slew rate. At 1808, the critical negative voltage slew rate is identified and at t2 the voltage reaches the fault condition.

In FIG. 18B, at 1814 at time t3 current is flowing at the normal operating condition I1. At 1815, the current increases toward the fault condition. At 1816, the first positive current slew rate is obtained. At 1817, the second positive current slew rate is obtained. At 1818, the critical positive slew rate is detected and at t4 the current has reached the fault condition.

Figure 19A:
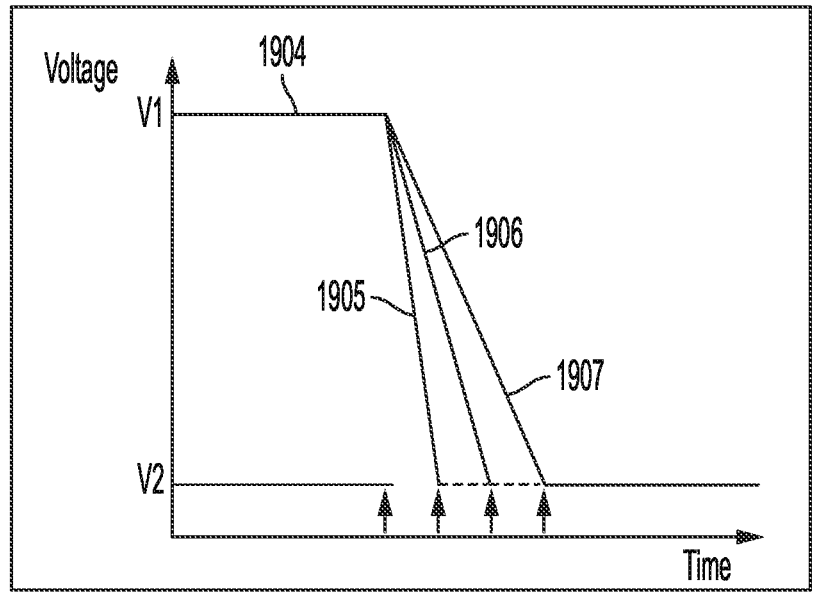
FIGS. 19A and 19B are timing diagrams illustrating alternative voltage and current slew rates, respectively, in example embodiments.
Figure 19B:
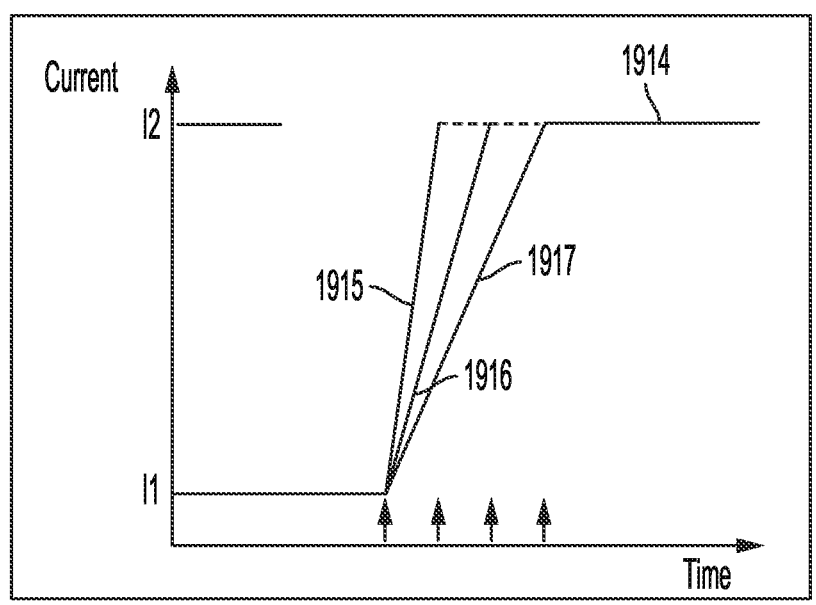

FIGS. 19A and 19B are timing diagrams illustrating alternative voltage and current slew rates, respectively, in example embodiments. In FIG. 19A, 1904 is the voltage at the normal operating condition V1. 1905 is the voltage having a first negative slew rate faster than the critical negative voltage slew rate threshold and reaching the fault condition V2. 1906 is the voltage having a second negative voltage slew rate at the critical negative voltage slew rate threshold. 1907 is the voltage having a third negative voltage slew rate slower than the critical negative voltage slew rate threshold. Consequently, the slew rates 1905 and 1906 are indicative of a possible arc flash and the slew rate 1907 is not indicative of a possible arc flash. In such examples, the voltage sensor processor 52 may provide an indication of an arc flash to the processor for 1905 and 1906 but not 1907.

In FIG. 19B, 1914 is the current at the normal operating condition 11. 1915 is the current having a first positive slew rate faster than the critical positive current slew rate threshold and reaching the fault condition 12. 1916 is the current having a second positive current slew rate at the critical positive current slew rate threshold. 1917 is the current having a third positive current slew rate slower than the critical positive current slew rate threshold. Consequently, the slew rates 1915 and 1916 are indicative of a possible arc flash and the slew rate 1917 is not indicative of a possible arc flash. In such examples, the current sensor processor 51 may provide an indication of an arc flash to the processor for 1915 and 1916 but not 1917. Thus, as illustrated across FIGS. 15A-19B, the processor may determine, upon identification of an arc flash, one of the plurality of arc flash suppressors having a highest at least one of the current slew rate and voltage slew rate and cause the one of the plurality of arc flash suppressors with the highest at least one of the current slew rate and the voltage slew rate to create a short circuit condition across the power source to suppress the arc flash.

EXAMPLES

Example 1 is an arc flash suppressor, comprising: a main processor; a current sensor processor, operatively coupled to the main processor, configured to receive an input current from a power source and output to the main processor an indication of the input current having met a predetermined current slew rate; a voltage sensor processor, operatively coupled to the main processor, configured to receive an input voltage from the power source and output to the main processor an indication of the input voltage having met a predetermined voltage slew rate; a plasma ignition detector, operatively coupled to the main processor, configured to receive the input voltage from the power source and output to the main processor an indication of the input voltage having met a predetermined edge condition; an arc flash extinguishing circuit, operatively coupled to the main processor, the arc flash extinguishing circuit comprising a silicon component configured to create a short circuit condition between the power source upon receiving a command from the main processor; wherein the main processor is configured to: identify an arc flash based on having received the indication of the current having met the predetermined current slew rate, the indication of the voltage having met the predetermined voltage slew rate, and the voltage having met the predetermined edge condition within a predetermined time period; cause the arc flash extinguishing circuit to create the short circuit condition over the power source; command an overcurrent protection device operatively coupled to the power source to activate.

In Example 2, the subject matter of Example 1 includes that the current sensor processor is further configured to detect an absolute value of the input current and wherein the indication provided to the main processor by the current sensor processor is further indicative of the input current representing a short circuit condition; and the voltage sensor processor is further configured to detect an absolute value of the input voltage and wherein the indication provided to the main processor by the voltage sensor processor is further indicative of the input voltage representing a short circuit condition.

In Example 3, the subject matter of any one or more of Examples 1 and 2 includes that the input current represents the arc flash condition by meeting a maximum current threshold and the input voltage represents the short circuit condition by meeting a minimum voltage threshold.

In Example 4, the subject matter of any one or more of Examples 1-3 includes that the arc flash suppressor is configured to detect the arc flash based on direct current (DC) from the power source.

In Example 5, the subject one or more of Examples 1-4 includes that the main processor, the current sensor processor, the voltage sensor processor, the plasma ignition detector, and the arc flash extinguishing circuit are components of a first arc flash suppressor controller, and further comprising a second arc flash suppressor controller operatively coupled to the first arc flash suppressor controller and to the power source, wherein the first and second arc flash suppressors are both configured to identify the arc flash, cause a respective arc flash extinguisher to create the short circuit condition, and command the overcurrent protection device to activate.

In Example 6, the subject matter of one or more of Examples 1-5 includes that the arc flash suppressor is configured to detect the arc flash based on alternating current (AC) from the power source.

In Example 7, the subject matter of one or more of Examples 1-6 includes that the first arc flash suppressor controller is configured to detect an arc flash in the positive domain and the second arc flash suppressor is configured to detect the arc flash in the negative domain.

In Example 8, the subject matter of one or more of Examples 1-7 includes that upon either of the first or second arc flash suppressor controller detecting the arc flash, the other of the first or second arc flash suppressor controller is configured to create the short circuit condition and command the overcurrent protection device to activate.

In Example 9, the subject matter of one or more of Examples 1-8 includes that the arc flash suppressor is configured to be coupled in parallel with the power source.

In Example 10, the subject matter of one or more of Examples 1-9 includes that the overcurrent protection device is a circuit breaker.

Example 11 is a method of making an arc flash suppressor, comprising: operatively coupling a current sensor processor to a main processor, the current sensor processor configured to receive an input current from a power source and output to the main processor an indication of the input current having met a predetermined current slew rate; operatively coupling a voltage sensor processor to the main processor, configured to receive an input voltage from the power source and output to the main processor an indication of the input voltage having met a predetermined voltage slew rate; operatively coupling a plasma ignition detector to the main processor, the plasma ignition detector configured to receive the input voltage from the power source and output to the main processor an indication of the input voltage having met a predetermined edge condition; operatively coupling an arc flash extinguishing circuit to the main processor, the arc flash extinguishing circuit comprising a silicon component configured to create a short circuit condition between the power source upon receiving a command from the main processor; wherein the main processor is configured to: identify an arc flash based on having received the indication of the current having met the predetermined current slew rate, the indication of the voltage having met the predetermined voltage slew rate, and the voltage having met the predetermined edge condition within a predetermined time period; cause the arc flash extinguishing circuit to create the short circuit condition over the power source; command an overcurrent protection device operatively coupled to the power source to activate.

In Example 12, the subject matter of Example 11 includes configuring the current sensor processor to detect an absolute value of the input current and wherein the indication provided to the main processor by the current sensor processor is further indicative of the input current representing a short circuit condition; and configuring the voltage sensor processor to detect an absolute value of the input voltage and wherein the indication provided to the main processor by the voltage sensor processor is further indicative of the input voltage representing a short circuit condition.

In Example 13, the subject matter of one or more of Examples 11 and 12 includes that the input current represents the arc flash condition by meeting a maximum current threshold and the input voltage represents the short circuit condition by meeting a minimum voltage threshold.

In Example 14, the subject matter of one or more of Examples 11-13 includes configuring the arc flash suppressor to detect the arc flash based on direct current (DC) from the power source.

In Example 15, the subject matter of one or more of Examples 11-14 includes that the main processor, the current sensor processor, the voltage sensor processor, the plasma ignition detector, and the arc flash extinguishing circuit are components of a first arc flash suppressor controller, and further comprising: operatively coupling a second arc flash suppressor controller to the first arc flash suppressor controller and the power source, wherein the first and second arc flash suppressors are both configured to identify the arc flash, cause a respective arc flash extinguisher to create the short circuit condition, and command the overcurrent protection device to activate.

In Example 16, the subject matter of one or more of Examples 11-15 includes configuring the arc flash suppressor to detect the arc flash based on alternating current (AC) from the power source.

In Example 17, the subject matter of one or more of Examples 11-16 includes configuring the first arc flash suppressor controller to detect an arc flash in the positive domain and the second arc flash suppressor is configured to detect the arc flash in the negative domain.

In Example 18, the subject matter of one or more of Examples 11-17 includes configuring the first and second arc flash suppressor controllers to, upon either of the first or second arc flash suppressor controller detecting the arc flash, the other of the first or second arc flash suppressor controller creates the short circuit condition and command the overcurrent protection device to activate.

In Example 19, the subject matter of one or more of Examples 11-18 includes that coupling the arc flash suppressor is configured to be coupled in parallel with the power source.

In Example 20, the subject matter of one or more of Examples 11-19 includes that the overcurrent protection device is a circuit breaker.

Example 21 is a system, comprising: the arc flash suppressor of any one of Examples 1-10; the power source, operatively coupled to the arc flash suppressor; the overcurrent protection device, operatively coupled to the arc flash suppressor; and a power load, operatively coupled to the arc flash suppressor and the power source.

Example 22 is at least one machine-readable medium including instructions that, when executed by the main processor, cause the main processor to perform operations of the main processor of any of Examples 1-21.

Example 23 is an apparatus comprising means to implement any of Examples 1-21.

Example 24 is a system to implement any of Examples 1-21.

Example 25 is a method to implement any of Examples 1-21.

The above-detailed description includes references to the accompanying drawings, which form a part of the detailed description. The drawings show, by way of illustration, specific embodiments. These embodiments are also referred to herein as "examples." Such examples may include elements in addition to those shown and described. However, the present inventor also contemplates examples in which only those elements shown and described are provided.

All publications, patents, and patent documents referred to in this document are incorporated by reference herein in their entirety, as though individually incorporated by reference. In the event of inconsistent usage between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels and are not intended to impose numerical requirements on their objects.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the scope disclosed herein.

The above description is intended to be, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. In addition, in the above Detailed Description, various features may be grouped together to streamline the disclosure. This should not be interpreted as intending that an unclaimed disclosed feature is essential to any claim. Rather, the inventive subject matter may lie in less than all features of a particular disclosed embodiment.

Thus, the following claims are hereby incorporated into the Detailed Description, with each claim standing on its own as a separate embodiment.

What is claimed is:

1. A system, comprising:
   a plurality of arc flash suppressors coupled in series between a power source and a load;
   a main processor operatively coupled to the plurality of arc flash suppressors;
   wherein each arc suppressor of the plurality of arc suppressors is configured to determine at least one of a current slew rate and a voltage slew rate from the load and output the at least one of the current slew rate and voltage slew rate to the main processor;
   wherein the main processor is configured to:
   identify the presence of an arc flash based on at least one of the of the current slew rates and voltage slew rates provided by the plurality of arc flash suppressors meeting a predetermined current slew rate or a predetermined voltage slew rate, respectively;
   determine, upon identification of an arc flash, one of the plurality of arc flash suppressors having a highest at least one of the current slew rate and voltage slew rate;
   cause the one of the plurality of arc flash suppressors with the highest at least one of the current slew rate and the voltage slew rate to create a short circuit condition across the power source to suppress the arc flash.

2. The system of claim 1, wherein the main processor is a component of one of the plurality of arc flash suppressors.

3. The system of claim 1, wherein each of the plurality of arc flash suppressors comprises:
   a current sensor processor, operatively coupled to the main processor, configured to receive an input current from the power source and output to the main processor an indication of the input current having met the predetermined current slew rate; and
   a voltage sensor processor, operatively coupled to the main processor, configured to receive an input voltage from the power source and output to the main processor an indication of the input voltage having met the predetermined voltage slew rate.

4. The system of claim 3, wherein each of the plurality of arc flash suppressors further comprises a plasma ignition detector, operatively coupled to the main processor, configured to receive the input voltage from the power source and output to the main processor an indication of the input voltage having met a predetermined edge condition, and wherein the main processor is further configured to identify the presence of the arc flash based on the indication of the input voltage having met the predetermined edge condition.

5. The system of claim 4, wherein each of the plurality of arc flash suppressors further comprises an arc flash extinguishing circuit, operatively coupled to the main processor, the arc flash extinguishing circuit comprising a silicon component configured to create the short circuit condition across the power source upon receiving a command from the main processor.

6. The system of claim 5, further comprising an overcurrent protection device operatively coupled to the power source and wherein the main processor is further configured to command the overcurrent protection device operatively coupled to the power source to activate upon the detection of the arc flash.

7. The system of claim 6, wherein:
   the current sensor processor is further configured to detect an absolute value of the input current and wherein the indication provided to the main processor by the current sensor processor is further indicative of the input current representing a short circuit condition; and
   the voltage sensor processor is further configured to detect an absolute value of the input voltage and wherein the indication provided to the main processor by the voltage sensor processor is further indicative of the input voltage representing a short circuit condition.

8. The system of claim 7, wherein the input current represents the arc flash condition by meeting a maximum current threshold and the input voltage represents the short circuit condition by meeting a minimum voltage threshold.

9. The system of claim 8, wherein the arc flash suppressor is configured to detect the arc flash based on direct current (DC) from the power source.

10. The system of claim 9, wherein the main processor, the current sensor processor, the voltage sensor processor, the plasma ignition detector, and the arc flash extinguishing circuit are components of a first arc flash suppressor controller, and further comprising a second arc flash suppressor controller operatively coupled to the first arc flash suppressor controller and the power source, wherein the first and second arc flash suppressors are both configured to identify the arc flash, cause a respective arc flash extinguishing circuit to create the short circuit condition, and command the overcurrent protection device to activate.

11. A method of zonal arc flash suppression, comprising:
   coupling a plurality of arc flash suppressors in series between a power source and a load;
   operatively coupling a main processor to the plurality of arc flash suppressors;
   wherein each arc suppressor of the plurality of arc suppressors is configured to determine at least one of a current slew rate and a voltage slew rate from the load and output the at least one of the current slew rate and voltage slew rate to the main processor;
   wherein the main processor is configured to:
   identify the presence of an arc flash based on at least one of the of the current slew rates and voltage slew rates provided by the plurality of arc flash suppressors meeting a predetermined current slew rate or a predetermined voltage slew rate, respectively;
   determine, upon identification of an arc flash, one of the plurality of arc flash suppressors having a highest at least one of the current slew rate and voltage slew rate;
   cause the one of the plurality of arc flash suppressors with the highest at least one of the current slew rate and the voltage slew rate to create a short circuit condition across the power source to suppress the arc flash.

12. The method of claim 11, wherein the main processor is a component of one of the plurality of arc flash suppressors.

13. The method of claim 11, wherein each of the plurality of arc flash suppressors comprises:
   a current sensor processor, operatively coupled to the main processor, configured to receive an input current from the power source and output to the main processor an indication of the input current having met the predetermined current slew rate; and
   a voltage sensor processor, operatively coupled to the main processor, configured to receive an input voltage from the power source and output to the main processor an indication of the input voltage having met the predetermined voltage slew rate.

14. The method of claim 13, wherein each of the plurality of arc flash suppressors further comprises a plasma ignition detector, operatively coupled to the main processor, configured to receive the input voltage from the power source and output to the main processor an indication of the input voltage having met a predetermined edge condition, and wherein the main processor is further configured to identify the presence of the arc flash based on the indication of the input voltage having met the predetermined edge condition.

15. The method of claim 14, wherein each of the plurality of arc flash suppressors further comprises an arc flash extinguishing circuit, operatively coupled to the main processor, the arc flash extinguishing circuit comprising a silicon component configured to create the short circuit condition across the power source upon receiving a command from the main processor.

16. The method of claim 15, further comprising an overcurrent protection device operatively coupled to the power source and wherein the main processor is further configured to command the overcurrent protection device operatively coupled to the power source to activate upon the detection of the arc flash.

17. The method of claim 16, wherein:
the current sensor processor is further configured to detect an absolute value of the input current and wherein the indication provided to the main processor by the current sensor processor is further indicative of the input current representing a short circuit condition; and
the voltage sensor processor is further configured to detect an absolute value of the input voltage and wherein the indication provided to the main processor by the voltage sensor processor is further indicative of the input voltage representing a short circuit condition.

18. The method of claim 17, wherein the input current represents the arc flash condition by meeting a maximum current threshold and the input voltage represents the short circuit condition by meeting a minimum voltage threshold.

19. The method of claim 18, wherein the arc flash suppressor is configured to detect the arc flash based on direct current (DC) from the power source.

20. The method of claim 19, wherein the main processor, the current sensor processor, the voltage sensor processor, the plasma ignition detector, and the arc flash extinguishing circuit are components of a first arc flash suppressor controller, and further comprising a second arc flash suppressor controller operatively coupled to the first arc flash suppressor controller and the power source, wherein the first and second arc flash suppressors are both configured to identify the arc flash, cause a respective arc flash extinguishing circuit to create the short circuit condition, and command the overcurrent protection device to activate.

* * * * *